United States Patent
Yagi et al.

(10) Patent No.: US 9,144,073 B2
(45) Date of Patent: Sep. 22, 2015

(54) RADIO BASE STATION AND COMMUNICATION CONTROL METHOD

(75) Inventors: Masahiro Yagi, Kawasaki (JP); Masaaki Nakata, Yamato (JP); Nobuaki Takamatsu, Koto-ku (JP); Hiroki Fujita, Yokohama (JP); Yoshizo Sato, Yawata (JP)

(73) Assignee: KYOCERA Corporation, Kyoto (JP)

( * ) Notice: Subject to any disclaimer, the term of this patent is extended or adjusted under 35 U.S.C. 154(b) by 275 days.

(21) Appl. No.: 13/810,413

(22) PCT Filed: Jul. 15, 2011

(86) PCT No.: PCT/JP2011/066275
§ 371 (c)(1),
(2), (4) Date: Feb. 26, 2013

(87) PCT Pub. No.: WO2012/008593
PCT Pub. Date: Jan. 19, 2012

(65) Prior Publication Data
US 2013/0230018 A1 Sep. 5, 2013

(30) Foreign Application Priority Data

Jul. 16, 2010 (JP) ................. 2010-162331
Jul. 16, 2010 (JP) ................. 2010-162332
Jul. 16, 2010 (JP) ................. 2010-162333

(51) Int. Cl.
| H04W 72/04 | (2009.01) |
| H04W 56/00 | (2009.01) |
| H04B 7/06  | (2006.01) |
| H04B 7/12  | (2006.01) |

(Continued)

(52) U.S. Cl.
CPC ......... *H04W 72/0453* (2013.01); *H04B 7/0615* (2013.01); *H04B 7/12* (2013.01); *H04L 5/0048* (2013.01); *H04L 5/0007* (2013.01); *H04W 72/046* (2013.01); *H04W 88/08* (2013.01)

(58) Field of Classification Search
USPC ................................. 370/329, 334, 337, 347
See application file for complete search history.

(56) References Cited

U.S. PATENT DOCUMENTS

| 5,886,987 A * | 3/1999 | Yoshida et al. ............... 370/318 |
| 2002/0085620 A1 * | 7/2002 | Mesecher ..................... 375/130 |

(Continued)

FOREIGN PATENT DOCUMENTS

| WO | 2009/136658 A2 | 11/2009 |
| WO | 2010/061768 A1 | 6/2010 |

OTHER PUBLICATIONS

An Office Action; Notice of Reason for Rejection, issued by the Japanese Patent Office on Feb. 18, 2014, which corresponds to Japanese Patent Application No. 2010-162331 and is related to U.S. Appl. No. 13/810,413; with English language statement of relevance.

(Continued)

*Primary Examiner* — Andrew Lee
(74) *Attorney, Agent, or Firm* — Studebaker & Brackett PC

(57) ABSTRACT

Disclosed is a wireless base station (eNB1-1) that sets to each serving wireless terminal (UE2) different frequency bandwidths (SRS transmission frequency bandwidths) that are used when said serving wireless terminals (UE2) send SRS at a predetermined special sub-frame timing. In addition the wireless base station (eNB1-1) sends the set SRS transmission frequency bandwidth information to the serving wireless terminals (UE2).

23 Claims, 28 Drawing Sheets

(51) Int. Cl.
*H04L 5/00* (2006.01)
*H04W 88/08* (2009.01)

(56) References Cited

U.S. PATENT DOCUMENTS

| | | | |
|---|---|---|---|
| 2003/0017852 A1* | 1/2003 | Miyatani | 455/562 |
| 2009/0098831 A1* | 4/2009 | Deng et al. | 455/73 |
| 2009/0278742 A1 | 11/2009 | Mehta et al. | |
| 2009/0279447 A1 | 11/2009 | Mehta et al. | |
| 2009/0318157 A1* | 12/2009 | Hoshino et al. | 455/450 |
| 2010/0165894 A1* | 7/2010 | Furuskar et al. | 370/281 |
| 2010/0246638 A1 | 9/2010 | Mehta et al. | |
| 2011/0261716 A1* | 10/2011 | Kim et al. | 370/252 |
| 2011/0305212 A1 | 12/2011 | Miyatake et al. | |
| 2012/0182895 A1* | 7/2012 | Jwa | 370/252 |
| 2012/0190396 A1* | 7/2012 | Oyama | 455/517 |
| 2012/0327804 A1* | 12/2012 | Park et al. | 370/252 |
| 2013/0010689 A1* | 1/2013 | Tanaka et al. | 370/328 |

OTHER PUBLICATIONS

3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release 8).

LG Electronics; 3GPP TSG RAN WG1 #50bis; Frequency hopping operation for UL sounding RS; Shanghai, China; Oct. 8-12, 2007; R1-074191.

International Search Report; PCT/JP2011/066275; Aug. 30, 2011.

* cited by examiner

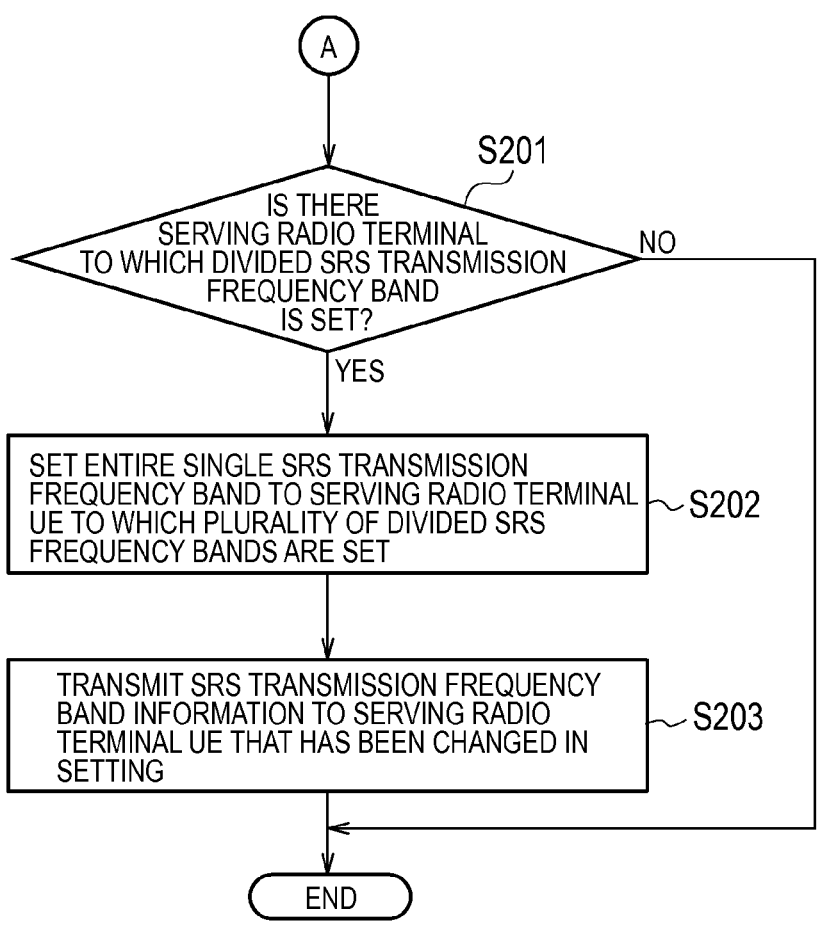

RADIO BASE STATION AND COMMUNICATION CONTROL METHOD

TECHNICAL FIELD

The present invention relates to a radio base station that transmits and receives a radio signal to and from a radio terminal using a plurality of antennas, and a communication control method in the radio base station.

BACKGROUND ART

In 3GPP (Third Generation Partnership Project), according to a radio communication system corresponding to LTE (Long Term Evolution) having a standard being currently designed, a radio base station eNB performs assignment of a radio resource in radio communication between the radio base station eNB and a radio terminal UE (for example, refer to Non Patent Literature 1). Furthermore, in the radio communication system corresponding to the LTE, one of frequency division duplex (FDD) and time division duplex (TDD) is employed in the radio communication between the radio base station eNB and the radio terminal UE.

Moreover, in an LTE (TDD-LTE) radio communication system employing the TDD, there has been discussed a feature where a radio base station eNB performs control for adaptively directing a beam (adaptive array control) toward the radio terminal UE at the time of transmission of a downlink radio signal, in order to ensure communication quality between the radio base station eNB and a radio terminal UE that is moving.

Firstly, according to a technique of calculating an antenna weight, when a radio base station eNB receives a sounding reference signal (SRS) which is an uplink radio signal from a radio terminal UE, it is considered that the radio base station eNB assigns a downlink radio resource (a downlink resource block), which has a frequency band equal to a frequency band of the latest received SRS, to a radio terminal UE serving as a transmission source of the latest received SRS, and further calculates an antenna weight for the assigned downlink resource block.

However, in the aforementioned technique, each radio terminal UE independently sets a transmission timing of SRS. Accordingly, a frequency band that is used in the transmission of the SRS may be concentrated on a specific frequency band. In such a case, although there is a vacancy in the downlink resource block, it is probable that use efficiency may be deteriorated because a downlink resource block of a specific frequency band is concentrated on a plurality of radio terminals UE.

Secondly, according to a technique of calculating the antenna weight, when a radio base station eNB received a sounding reference signal (SRS) which is an uplink radio signal from a radio terminal UE, it is considered that the radio base station eNB calculates an antenna weight for downlink RB which has a frequency band equal to a frequency band of the SRS.

However, in the TDD-LTE radio communication system, OFDMA (Orthogonal Frequency Division Multiplexing Access) is employed in downlink radio communication and SC-FDMA (Single Carrier Frequency Division Multiple Access) is employed in uplink radio communication. In these multiplexing schemes, individually in uplink and downlink, a radio resource (a resource block: RB) is arranged in two-dimensions of a frequency and a time to realize user multiplexing.

Therefore, there is a case in which a frequency band of downlink RB assigned to a radio terminal UE is not equal to a frequency band of uplink RB. In such a case, since there is no downlink RB having a frequency band equal to a frequency band of SRS, it is not possible to calculate an antenna weight for the downlink RB.

Thirdly, according to a technique of calculating the antenna weight, when a radio base station eNB receives a sounding reference signal (SRS) which is an uplink radio signal from a radio terminal UE, it is considered that the radio base station eNB assigns a downlink radio resource (a downlink resource block), which has a frequency band equal to a frequency band of the latest received SRS, to a radio terminal UE serving as a transmission source of the latest received SRS, and further calculates an antenna weight for the assigned downlink resource block.

However, in the aforementioned techniques, in order to transmit the SRS, each radio terminal UE uses an entire frequency band in which a bandwidth is determined in advance. As described above, when a bandwidth of a transmission frequency band of the SRS is fixed, if interference from another radio base station eNB occurs in the transmission frequency band of the SRS, it is not possible to appropriately cope with the interference.

CITATION LIST

Non Patent Literature

[Non Patent Literature 1] 3GPP TS 36.211 V8.7.0 "Physical Channels and Modulation", MAY 2009

SUMMARY OF INVENTION

A first feature of the present invention is summarized as a radio base station (radio base station eNB1-1) of an adaptive array scheme for applying an antenna weight to a plurality of antennas (antennas 108A, 108B, 108C, 108D), comprising: a control unit (SRS transmission frequency band setting unit 112) that sets, to each serving radio terminal (radio terminal UE 2-1, 2-2, 2-3, 2-4), different reference signal transmission frequency bands that are used for transmission of a reference signal to be referred to in calculation of the antenna weight; and a transmission unit (radio communication unit 106) that transmits information on the reference signal transmission frequency bands set by the control unit to the serving radio terminal.

Such a radio base station sets, to each radio terminal, different frequency bands that are used for the transmission of a reference signal to be referred to in the calculation of an antenna weight, and transmits information on the corresponding reference signal transmission frequency bands to the radio terminal. Consequently, each radio terminal is able to transmit a reference signal using the different frequency bands. Thus, when the radio base station assigns a downlink radio resource, which has a frequency band equal to a frequency band used for the transmission of the latest received reference signal, to a radio terminal serving as a transmission source of the latest received reference signal, a frequency band that is used for the transmission of a reference signal is not concentrated on a specific frequency band, so that it is possible to improve a use efficiency of a downlink radio resource.

A second feature of the present invention is summarized as that the reference signal is simultaneously transmitted from a plurality of serving radio terminals while switching a frequency band for each predetermined switching time period by a predetermined rule, and the control unit sets different reference signal transmission frequency bands to each serving radio terminal at a predetermined timing.

A third feature of the present invention is summarized as that the control unit sets an unset reference signal transmission frequency band of the reference signal transmission frequency bands to a new serving radio terminal, when the new serving radio terminal is turned up where the reference signal transmission frequency band is not set.

A fourth feature of the present invention is summarized as that the control unit sets a same reference signal transmission frequency band to a plurality of serving radio terminals, when there is no unset reference signal transmission frequency band.

A fifth feature of the present invention is summarized as that the control unit sets the unset reference signal transmission frequency band to one of the plurality of serving radio terminals, when the unset reference signal transmission frequency band is turned up in a case where the same reference signal transmission frequency band has been set to the plurality of serving radio terminals.

A sixth feature of the present invention is summarized as that the control unit sets a reference signal transmission frequency band, which is equal to a reference signal transmission frequency band of another serving radio terminal, to a serving radio terminal with lower priority, when priority for setting of a reference signal transmission frequency band has been determined for the serving radio terminal.

A seventh feature of the present invention is summarized as a communication control method in a radio base station of an adaptive array scheme for applying an antenna weight to a plurality of antennas, comprising the steps of: setting, to each serving radio terminal, different reference signal transmission frequency bands that are used for transmission of a reference signal to be referred to in calculation of the antenna weight; and transmitting information on the set reference signal transmission frequency bands to the serving radio terminal.

An eight feature of the present invention is summarized as a radio base station (radio base station eNB1-1) of an adaptive array scheme for applying an antenna weight to a plurality of antennas (antennas 108A, 108B, 108C, 108D), comprising: a reception unit (radio communication unit 106) that receives a reference signal (SRS) to be referred to in calculation of the antenna weight from a serving radio terminal; and an assignment unit (RB assignment unit 114) that preferentially assigns a radio resource (downlink radio resource block) to the serving radio terminal (radio terminal UE 2-1), the radio resource having a frequency band used for transmission of a reference signal received at a time point near a target subframe and before the target subframe, wherein the reference signal is transmitted by the serving radio terminal while switching a frequency band. Such a radio base station preferentially assigns the radio resource to the serving radio terminal, the radio resource having the frequency band used for transmission of the reference signal received at a time point near a target subframe and before the target subframe, wherein the reference signal is transmitted by the serving radio terminal. Consequently, the radio base station can refer the reference signal, which is considered as having a propagation environment close to those of the downlink radio resource assigned to the serving radio terminal, in a calculation of the antenna weight for the downlink radio resource assigned to the serving radio terminal, the calculation of the antenna weight can be performed appropriately.

A ninth feature of the present invention is summarized as the radio base station, further comprising: a calculation unit (antenna weigh calculation unit 116) that sets the antenna weight such that a desired wave direction of a beam having a frequency band used for transmission of a reference signal from the serving radio terminal is directed to the serving radio terminal.

A tenth feature of the present invention is summarized as that the target subframe includes a plurality of subframes.

A eleventh feature of the present invention is summarized as the reference signal is transmitted from the serving radio terminal while switching a frequency band for each predetermined switching time period, and the assignment unit preferentially assigns a radio resource to the serving radio terminal, the radio resource having a frequency band used for transmission of a reference signal received in the predetermined switching time period from the target subframe and before the target subframe.

A twelfth feature of the present invention is summarized as the reference signal is transmitted by the serving radio terminal at least once in a communication frame time period, and the assignment unit preferentially assigns a radio resource having a frequency band used for transmission of a reference signal received in the communication frame time period from the target subframe and before the target subframe.

A thirteenth feature of the present invention is summarized as a radio base station of an adaptive array scheme for applying an antenna weight to a plurality of antennas, comprising: a reception unit (radio communication unit 106) that receives a reference signal to be referred to in calculation of the antenna weight from a non-serving radio terminal; and a calculation unit (antenna weight calculation unit 116) that sets the antenna weight such that a null direction of a beam is directed to the non-serving radio terminal, the beam having a frequency band used for transmission of a reference signal received at a time point near a target subframe and before the target subframe, wherein the reference signal is transmitted by the non-serving radio terminal while switching a frequency band.

A fourteenth feature of the present invention is summarized as a communication control method in a radio base station of an adaptive array scheme for applying an antenna weight to a plurality of antennas, comprising the steps of: receiving a reference signal to be referred to in calculation of the antenna weight from a serving radio terminal; and preferentially assigning a radio resource to the serving radio terminal, the radio resource having a frequency band used for transmission of a reference signal received at a time point near a target subframe and before the target subframe, wherein the reference signal is transmitted by the serving radio terminal while switching a frequency band.

A fifteenth feature of the present invention is summarized as a communication control method in a radio base station of an adaptive array scheme for applying an antenna weight to a plurality of antennas, comprising the steps of: receiving a reference signal to be referred to in calculation of the antenna weight from a non-serving radio terminal; and calculating the antenna weight such that a null direction of a beam is directed to the non-serving radio terminal, the beam having a frequency band used for transmission of a reference signal received at a time point near a target subframe and before the target subframe, wherein the reference signal is transmitted by the non-serving radio terminal while switching a frequency band.

A sixteenth feature of the present invention is summarized as a radio base station (radio base station eNB1-1) of an adaptive array scheme for applying an antenna weight to a plurality of antennas (antennas 108A, 108B, 108C, 108D), comprising: a reception unit (radio communication unit 106)

that receives a reference signal to be referred to in calculation of the antenna weight from a serving radio terminal (radio terminals UE 2-1, 2-2, 2-3, 204); a control unit (SRS transmission frequency band setting unit 112) that sets a bandwidth of a reference signal transmission frequency band available for transmission of a reference signal by the serving radio terminal, according to priority (setting priority) determined on the basis of a communication state in the serving radio terminal; and a transmission unit (radio communication unit 106) that transmits information on the reference signal transmission frequency bands set by the control unit to the serving radio terminal.

Such a radio base station sets the bandwidth of the reference signal transmission frequency band available for transmission of the reference signal by the serving radio terminal, according to priority (setting priority) determined on the basis of the communication state in the serving radio terminal, and transmits the information on the reference signal transmission frequency bands. Consequently, the bandwidth of the reference signal transmission frequency band available for the transmission of the reference signal by the serving radio terminal is changed according to the communication state in the serving radio terminal. That is, it is possible to increase options of the frequency bands available for the transmission of the reference signal, and to decrease interference from the other radio base station in the transmission of the reference signal.

A seventeenth feature of the present invention is summarized as that the control unit increases the bandwidth of the reference signal transmission frequency band as priority of the serving radio terminal is higher.

An eighteenth feature of the present invention is summarized as that the control unit sets different reference signal transmission frequency bands to each serving radio terminal.

A nineteenth feature of the present invention is summarized as that the reference signal is simultaneously transmitted from a plurality of serving radio terminals while switching a frequency band for each predetermined switching time period by a predetermined rule, and the control unit sets different reference signal transmission frequency bands to each serving radio terminal at a predetermined timing.

A twentieth feature of the present invention is summarized as that the control unit sets an unset reference signal transmission frequency band of the reference signal transmission frequency bands to the new serving radio terminal, when a new serving radio terminal is turned up where the reference signal transmission frequency band is not set.

A twenty first feature of the present invention is summarized as that the control unit divides a single reference signal transmission frequency band and sets divided frequency bands to a plurality of serving radio terminals, when there is no unset reference signal transmission frequency band.

A twenty second feature of the present invention is summarized as that the control unit sets the unset reference signal transmission frequency band to one of the plurality of serving radio terminals, when the unset reference signal transmission frequency band is turned up in a case where the single reference signal transmission frequency band is divided and set to the plurality of serving radio terminals.

A twenty third feature of the present invention is summarized as a communication control method in a radio base station of an adaptive array scheme for applying an antenna weight to a plurality of antennas, comprising the steps of: receiving a reference signal to be referred to in calculation of the antenna weight from a serving radio terminal; setting a bandwidth of a reference signal transmission frequency band available for transmission of a reference signal by the serving radio terminal, according to priority determined on the basis of a communication state in the serving radio terminal; and transmitting information on the set reference signal transmission frequency bands to the serving radio terminal.

BRIEF DESCRIPTION OF DRAWINGS

FIG. 31 is a flowchart illustrating a second operation of the radio base station according to the third embodiment of the present invention.

DESCRIPTION OF EMBODIMENTS

[First Embodiment]

Figure 1:
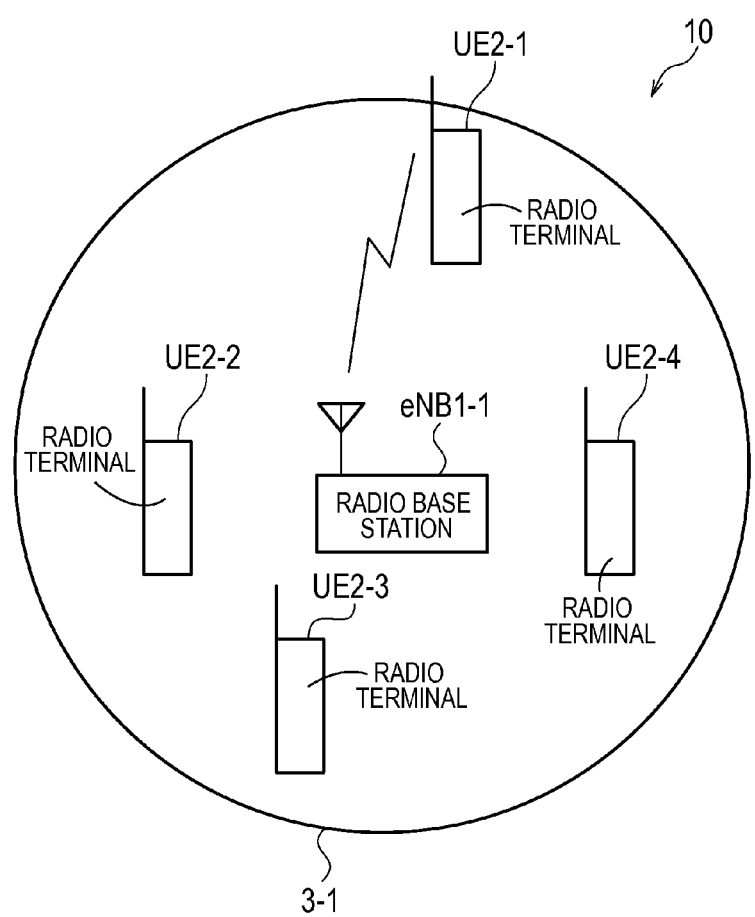
FIG. 1 is an entire schematic configuration diagram of a radio communication system according to a first embodiment of the present invention.

Next, a first embodiment of the present invention will be described with reference to the drawings. Specifically, the first embodiment will be described in sequence of (1.1) Configuration of radio communication system, (1.2) Configuration of radio base station, (1.3) Operation of radio base station, (1.4) Operation and effect, and (1.5) Other embodiments. It is to be noted that the same or similar reference numerals are applied to the same or similar parts through the drawings in the following embodiments.

(1.1) Configuration of Radio Communication System

FIG. 1 is an entire schematic configuration diagram of a radio communication system 10 according to the first embodiment of the present invention.

The radio communication system 10 illustrated in FIG. 1 is a TDD-LTE radio communication system. The radio communication system 10 includes a radio base station eNB1-1, a radio terminal UE2-1, a radio terminal UE2-2, a radio terminal UE2-3, and a radio terminal UE2-4.

In FIG. 1, the radio base station eNB1-1 constitutes E-UTRAN (Evolved-UMTS Terrestrial Radio Access Network). The radio terminal UE2-1 to the radio terminal UE2-4 exist in a cell 3-1 that is a communication available area provided by the radio base station eNB1-1.

The radio terminal UE2-1 to the radio terminal UE2-4 are terminals to which a resource block is assigned by the radio base station eNB1-1. In this case, when the radio base station eNB1-1 is set as a reference, the radio terminal UE2-1 to the radio terminal UE2-4 are serving radio terminals. Hereinafter, the radio terminal, to which the resource block is assigned by the radio base station eNB1-1, will be appropriately referred to as a serving radio terminal UE2.

Time division duplex is employed in radio communication between the radio base station eNB1-1 and the radio terminal UE2-1 to the radio terminal UE2-4, OFDMA (Orthogonal Frequency Division Multiplexing Access) is employed in downlink radio communication, and SC-FDMA (Single Carrier Frequency Division Multiple Access) is employed in uplink radio communication. Furthermore, downlink indicates a direction from the radio base station eNB1-1 to the radio terminal UE2-1 to the radio terminal UE2-4. Uplink indicates a direction from the radio terminal UE2-1 to the radio terminal UE2-4 to the radio base station eNB1-1.

The radio base station eNB1-1 assigns a resource block (RB) as a radio resource to the serving radio terminal UE2 in the cell 3-1.

The resource block includes a downlink resource block (downlink RB) to be used in the downlink radio communication and an uplink resource block (uplink RB) to be used in the uplink radio communication. A plurality of downlink resource blocks are arranged in the frequency direction and the time direction. Similarly, a plurality of uplink resource blocks are arranged in the frequency direction and the time direction.

Figure 2:
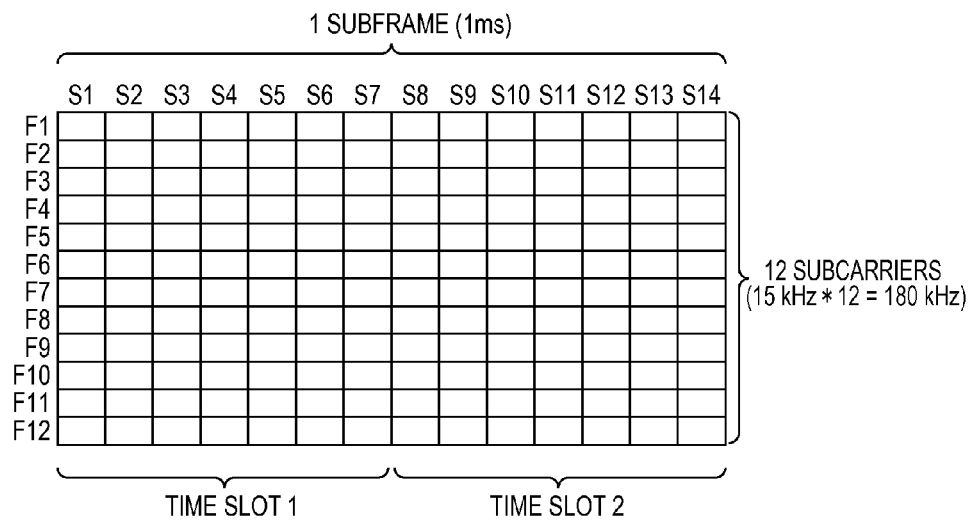
FIG. 2 is a diagram illustrating a format of a resource block according to the first embodiment of the present invention.

FIG. 2 is a diagram illustrating a format of the resource block. As illustrated in FIG. 2, the resource block is configured in one subframe having a time length of 1 [ms] in the time direction. The subframe includes a time zone S1 to a time zone S14. Among the time zone S1 to the time zone S14, the time zone S1 to the time zone S7 constitute a first half time slot (a time slot 1) and the time zone S8 to the time zone S14 constitute a latter half time slot (a time slot 2).

As illustrated in FIG. 2, the resource block has a frequency bandwidth of 180 [kHz] in the frequency direction. Furthermore, the resource block includes 12 subcarriers F1 to F12 having a frequency bandwidth of 15 [kHz].

Figure 3:
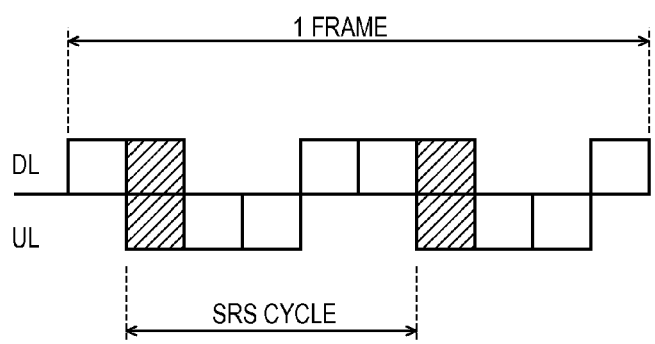
FIG. 3 is a diagram illustrating a format of a frame according to the first embodiment of the present invention.

Furthermore, in the time direction, a plurality of subframes constitute one frame. FIG. 3 is a diagram illustrating a format of the frame. The frame illustrated in FIG. 3 includes 10 subframes. The frame includes 10 subframes in the sequence of a subframe of a downlink resource block, subframes (special subframes: SSF) of both the downlink resource block and an uplink resource block, a subframe of the uplink resource block, a subframe of the uplink resource block, a subframe of the downlink resource block, a subframe of the downlink resource block, a special subframe, a subframe of the uplink resource block, a subframe of the uplink resource block, and a subframe of the downlink resource block.

Figure 4:
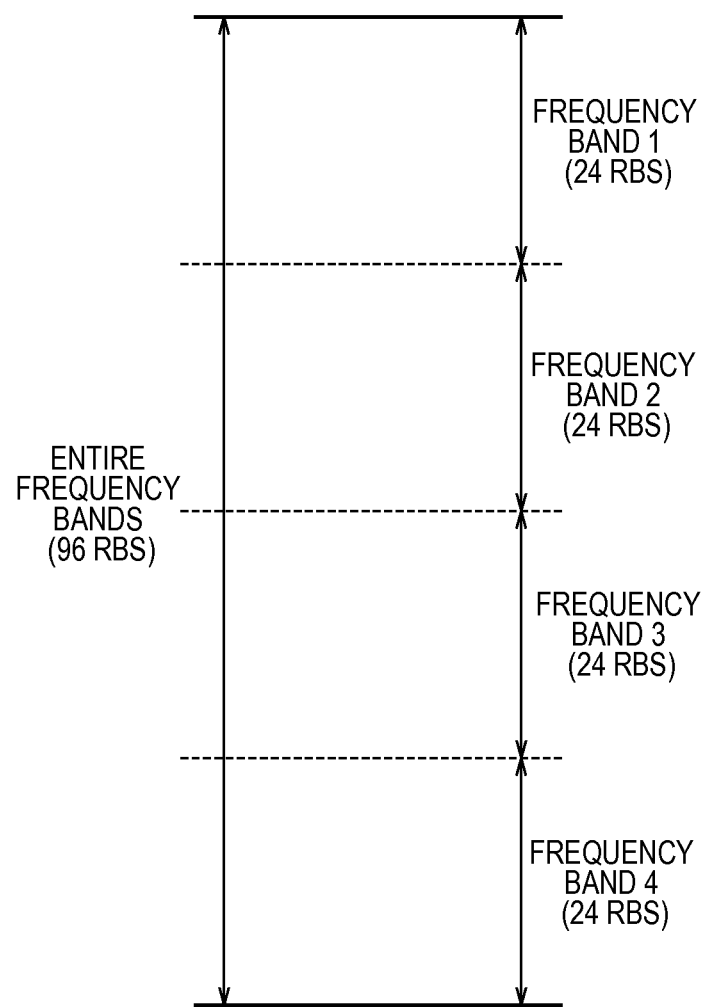
FIG. 4 is a diagram illustrating a configuration of an entire frequency band available in radio communication between a radio base station and a radio terminal according to the first embodiment of the present invention.

Furthermore, in the frequency direction, an entire frequency band available in the radio communication between the radio base station eNB1-1 and the serving radio terminal UE2 has bands corresponding to a plurality of resource blocks. Furthermore, the entire frequency band is divided into frequency bands corresponding to multiples of four of the number of the resource blocks. FIG. 4 is a diagram illustrating a configuration of the entire frequency band available in the radio communication between the radio base station eNB1-1 and the serving radio terminal UE2. As illustrated in FIG. 4, the entire frequency band available in the radio communication between the radio base station eNB1-1 and the serving radio terminal UE2 has bands corresponding to 96 resource blocks. Furthermore, the entire frequency band is divided into a frequency band 1 to a frequency band 4, each of which has bands corresponding to 24 resource blocks.

The downlink resource block includes a control information channel (PDCCH: Physical Downlink Control CHannel) for transmitting downlink control information, and a shared data channel (PDSCH: Physical Downlink Shared CHannel) for transmitting downlink user data in the time direction.

Meanwhile, the uplink resource block includes a control information channel (PUCCH: Physical Uplink Control CHannel) for transmitting uplink control information at both ends of an entire frequency band available in the uplink radio communication, and a shared data channel (PUSCH: Physical Uplink Shared CHannel) for transmitting uplink user data at the center part thereof.

(1.2) Configuration of Radio Base Station

Figure 5:
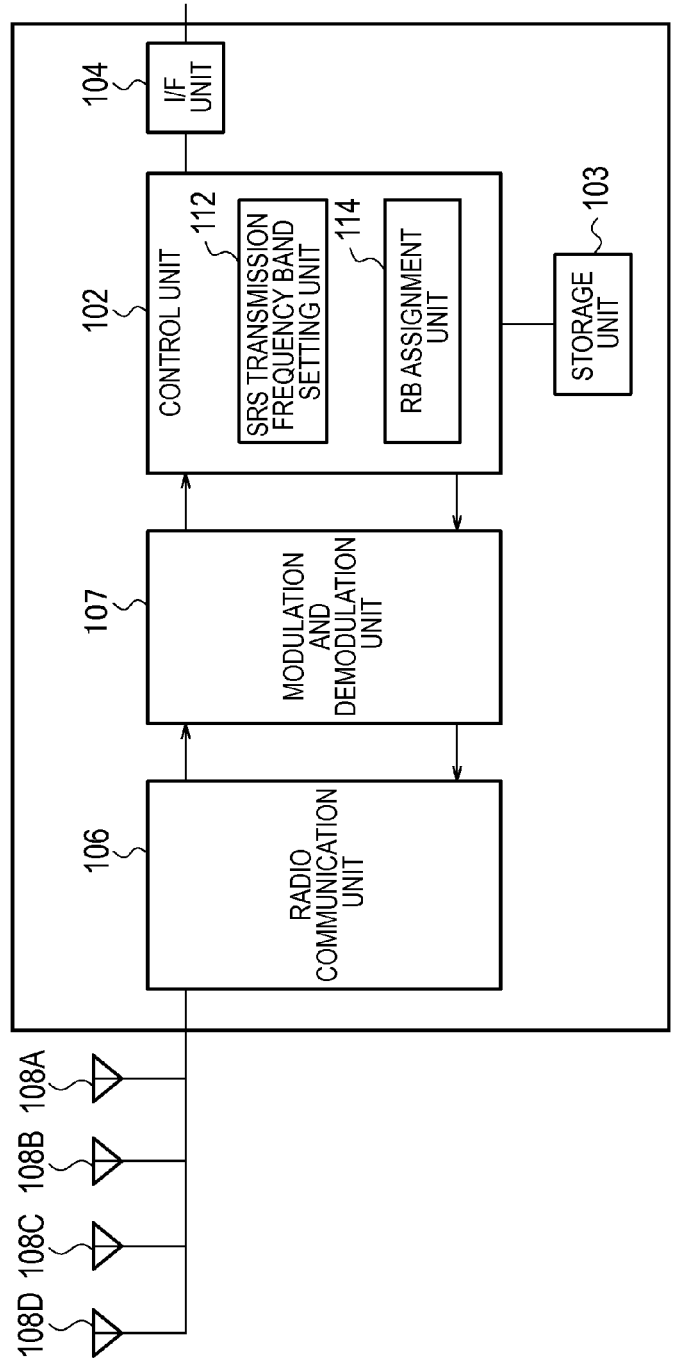
FIG. 5 is a configuration diagram of the radio base station according to the first embodiment of the present invention.

FIG. 5 is a configuration diagram of the radio base station eNB1-1. As illustrated in FIG. 5, the radio base station eNB1-1 is a radio base station of an adaptive array scheme for applying an antenna weight to a plurality of antennas, and includes a control unit 102, a storage unit 103, an I/F unit 104, a radio communication unit 106, a modulation and demodulation unit 107, an antenna 108A, an antenna 108B, an antenna 108C, and an antenna 108D.

The control unit 102, for example, is configured by a CPU, and controls various functions of the radio base station eNB1-1. The control unit 102 includes a sounding reference signal (SRS) transmission frequency band setting unit 112 and a resource block (RB) assignment unit 114. The storage unit 103, for example, is configured by a memory, and stores various types of information used for the control and the like of the radio base station eNB1-1.

The I/F unit 104 is able to communicate with another radio base station eNB through an X1 interface. Furthermore, the I/F unit 104 is able to communicate with EPC (Evolved Packet Core) (not shown), specifically, MME (Mobility Management Entity)/S-GW (Serving Gateway), through an S1 interface.

The radio communication unit 106 receives an uplink radio signal, which is transmitted from the serving radio terminal UE2-1, through the antenna 108A to the antenna 108D. Moreover, the radio communication unit 106 converts (down-converts) the received uplink radio signal to a baseband signal, and outputs the baseband signal to the modulation and demodulation unit 107.

The modulation and demodulation unit 107 performs demodulation and decoding processes for the input baseband signal. In this way, data included in the uplink radio signal transmitted from the radio terminal UE2-1 is obtained. The data is output to the control unit 102.

Furthermore, the modulation and demodulation unit 107 performs encoding and modulation of data from the control unit 102, thereby obtaining a baseband signal. The radio communication unit 106 converts (up-converts) the baseband signal to a downlink radio signal. Moreover, the modulation and demodulation unit 107 transmits the downlink radio signal through the antenna 108A to the antenna 108D.

The SRS transmission frequency band setting unit 112 of the control unit 102 sets, to each serving radio terminal UE2, different frequency bands (SRS transmission frequency bands) that are used when the serving radio terminal UE2 transmits a sounding reference signal (SRS) at a timing of a predetermined special subframe. Furthermore, the SRS is a signal to be referred to in the calculation of an antenna weight in the radio base station eNB1-1, and is an uplink radio signal of a radio frequency band.

The serving radio terminal UE2 uses a frequency hopping scheme, and transmits the SRS at each special subframe timing while switching the SRS transmission frequency band. In the first embodiment, a switching sequence is common in each serving radio terminal UE2. In the first embodiment, the SRS transmission frequency band is switched in the sequence of the frequency band 1, the frequency band 3, the frequency band 2, and the frequency band 4 illustrated in FIG. 4, and then returns to the frequency band 1, which is a periodical switching sequence. However, there is a difference in the SRS transmission frequency bands of each serving radio terminal UE2 at the same timing. Accordingly, the SRS transmission frequency bands at the timing of the predetermined special subframe are set to be different for each serving radio terminal UE2, so that the SRS transmission frequency bands in each special subframe after the predetermined special subframe are different for each serving radio terminal UE2.

Specifically, the SRS transmission frequency band setting unit 112 performs the following first process and second process.

(First Process)

Figure 6:
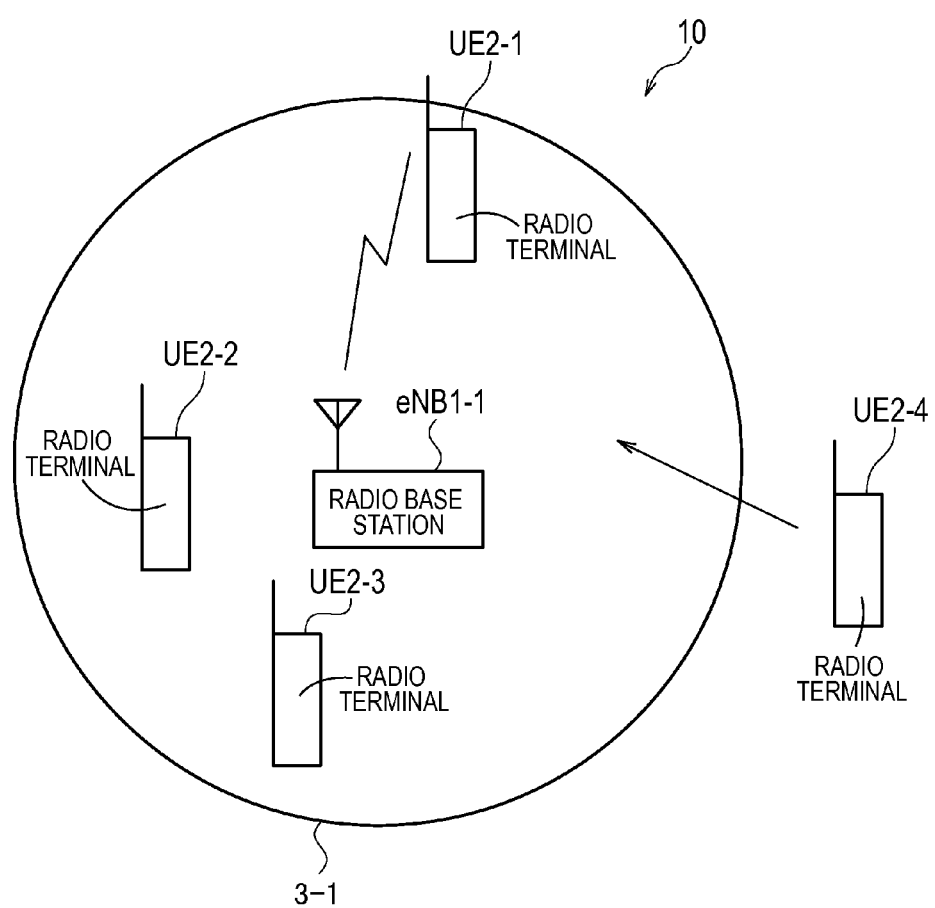
FIG. 6 is a diagram illustrating a first example of movement of the radio terminal according to the first embodiment of the present invention.

Considered is the case in which as illustrated in FIG. 6, serving radio terminals initially existing in the cell 3-1 are the serving radio terminal UE2-1 to the serving radio terminal UE2-3, and then the radio terminal UE2-4 newly enters the cell 3-1 and serves as a new serving radio terminal. In addition, the case, in which in the cell 3-1, the power of the radio terminal UE2-4 is turned from off to on and serves as the serving radio terminal, is also the same.

Figure 7:
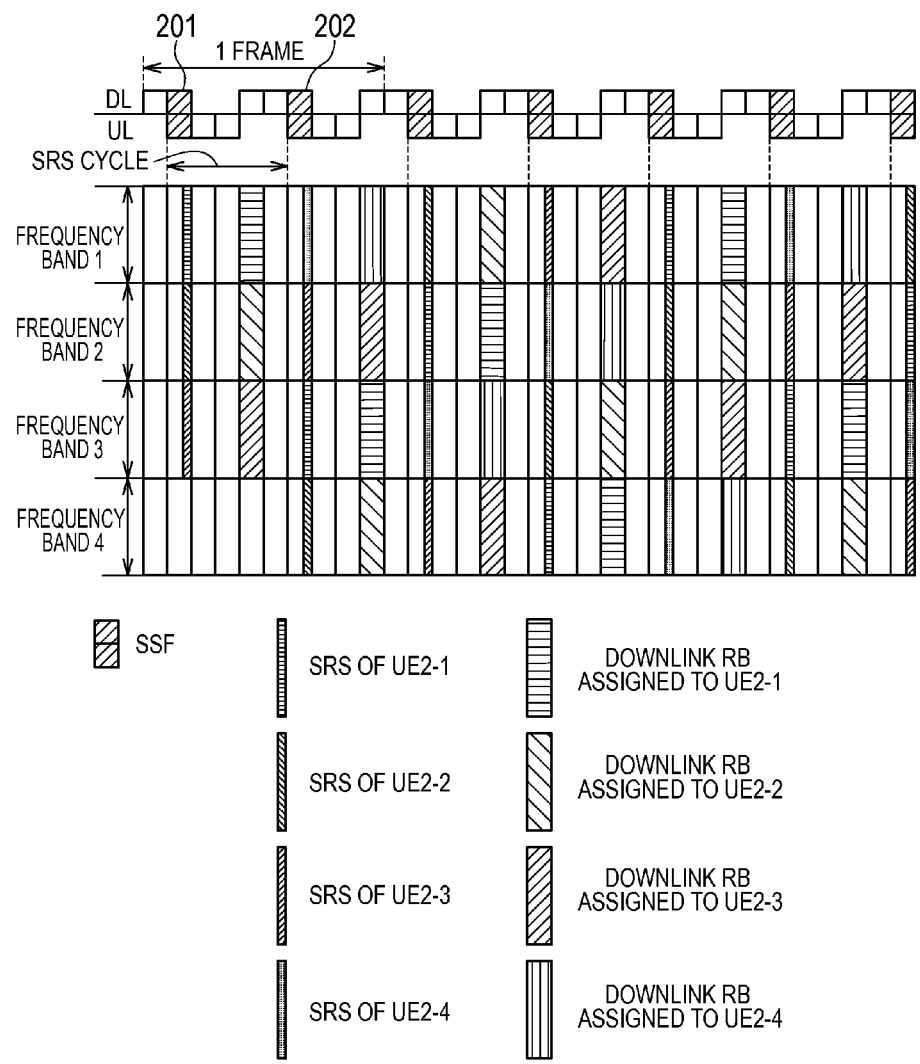
FIG. 7 is a diagram illustrating a first example of setting of a SRS transmission frequency band and correspondence between the SRS transmission frequency band and assigned downlink RB according to the first embodiment of the present invention.

When only the serving radio terminal UE2-1 to the serving radio terminal UE2-3 exist in the cell 3-1, the frequency band 1 is set as a transmission frequency band of SRS of the serving radio terminal UE2-1, the frequency band 2 is set as a transmission frequency band of SRS of the serving radio terminal UE2-2, and the frequency band 3 is set as a transmission frequency band of SRS of the serving radio terminal UE2-3 at a timing of a special subframe 201 in FIG. 7. Meanwhile, the frequency band 4 is an unset SRS transmission frequency band that is not set in any serving radio terminal.

Considered is the case in which then, between the timing of the special subframe 201 in FIG. 7 and the timing of a special subframe 202, the radio terminal UE2-4 newly enters the cell 3-1 and serves as the new serving radio terminal.

As described above, the switching sequence of the SRS transmission frequency band in the serving radio terminal UE2 is a sequence of the frequency band 1, the frequency band 3, the frequency band 2, and the frequency band 4. Accordingly, at the timing of the special subframe 202 in FIG. 7, the serving radio terminal UE2-1 transmits SRS using the frequency band 3, the serving radio terminal UE2-2 transmits SRS using the frequency band 4, and the serving radio terminal UE2-3 transmits SRS using the frequency band 2. That is, at the timing of the special subframe 202, the frequency band 1 is the unset SRS transmission frequency band.

In this case, the SRS transmission frequency band setting unit 112 sets the frequency band 1 (the unset SRS transmission frequency band) as a transmission frequency band of SRS of the new serving radio terminal UE2-4 at the timing of the special subframe 202 in FIG. 7. Moreover, the SRS transmission frequency band setting unit 112 transmits information on the frequency band 1 as information on the SRS transmission frequency band to the new serving radio terminal UE2-4 through the modulation and demodulation unit 107, the radio communication unit 106, and the antenna 108A to the antenna 108D. When the information on the frequency band 1 as the information on the SRS transmission frequency band is received, the new serving radio terminal UE2-4 transmits the SRS using the frequency band 1 at the timing of the special subframe 202 in FIG. 7.

(Second Process)

Figure 8:
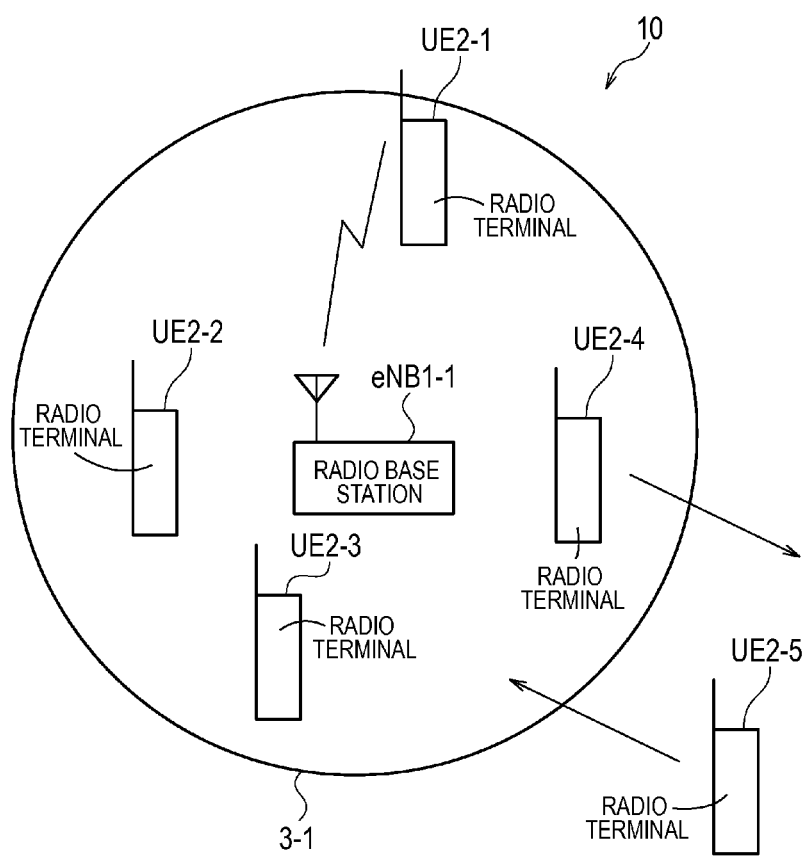
FIG. 8 is a diagram illustrating a second example of movement of the radio terminal according to the first embodiment of the present invention.

Considered is the case in which as illustrated in FIG. 8, serving radio terminals initially existing in the cell 3-1 are the serving radio terminal UE2-1 to the serving radio terminal UE2-4, a radio terminal UE2-5 newly enters the cell 3-1 and serves as a new serving radio terminal, and then the serving radio terminal UE2-4 moves out of the cell 3-1 and serves as a non-serving radio terminal. In addition, the case, in which in the cell 3-1, the power of the radio terminal UE2-5 is turned from off to on and serves as the serving radio terminal and then in the cell 3-1, the power of the radio terminal UE2-4 is turned from on to off and serves as the non-serving radio terminal, is also the same.

Figure 9:
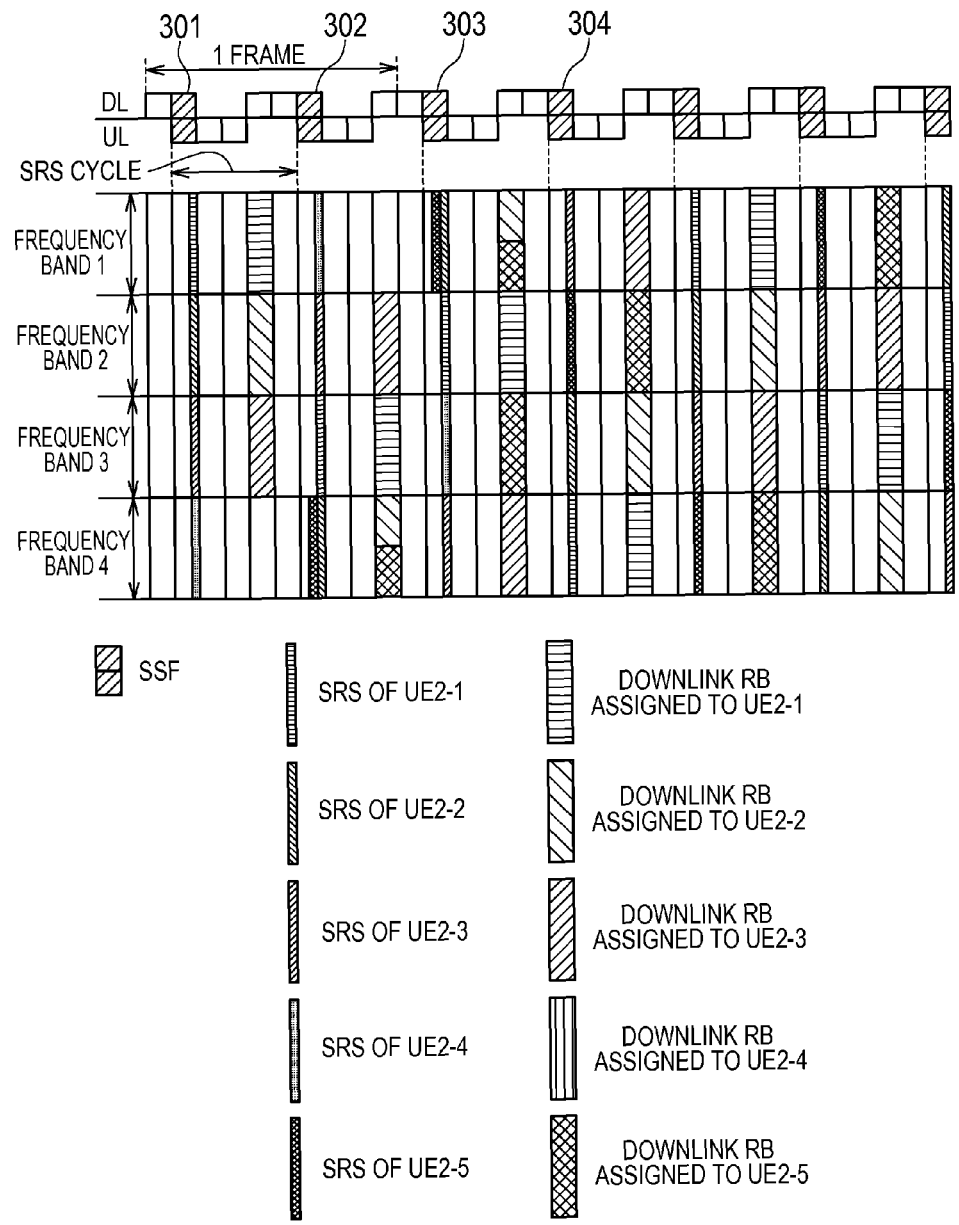
FIG. 9 is a diagram illustrating a second example of the setting of the SRS transmission frequency band and the correspondence between the SRS transmission frequency band and the assigned downlink RB according to the first embodiment of the present invention.

When only the serving radio terminal UE2-1 to the serving radio terminal UE2-4 exist in the cell 3-1, the frequency band 1 is set as a transmission frequency band of SRS of the serving radio terminal UE2-1, the frequency band 2 is set as a transmission frequency band of SRS of the serving radio terminal UE2-2, the frequency band 3 is set as a transmission frequency band of SRS of the serving radio terminal UE2-3, and the frequency band 4 is set as a transmission frequency band of SRS of the serving radio terminal UE2-4 at a timing of a special subframe 301 in FIG. 9.

Considered is the case in which then, between the timing of the special subframe 301 in FIG. 9 and a timing of a special subframe 302, the radio terminal UE2-5 newly enters the cell 3-1 and serves as the new serving radio terminal.

In this case, at the timing of the special subframe 302 in FIG. 9, the serving radio terminal UE2-1 transmits SRS using the frequency band 3, the serving radio terminal UE2-2 transmits SRS using the frequency band 4, the serving radio terminal UE2-3 transmits SRS using the frequency band 2, and the serving radio terminal UE2-4 transmits SRS using the frequency band 1. That is, at the timing of the special subframe 302, there is no unset SRS transmission frequency band.

In this case, the SRS transmission frequency band setting unit 112 designates priority (setting priority) of setting of the SRS transmission frequency band with respect to the serving radio terminal UE2-1 to a serving radio terminal UE2-5.

The setting priority is determined in advance based on various types of information. As a first example, the type of a communication service used by the serving radio terminal UE2 is considered. In this case, when the communication service is a VoIP service requiring real-time, the setting priority is low. As a second example, a price plan of a communication service in the serving radio terminal UE2 is considered. In this case, the setting priority is higher in a price plan requiring more good communication quality. Furthermore, as a third example, a position of the serving radio terminal UE2 is considered. In this case, the setting priority is higher as the distance between the serving radio terminal UE2 and the radio base station eNB1-1 is longer. Hereinafter, it is assumed that the setting priority has two levels of high and low.

Next, the SRS transmission frequency band setting unit 112 sets the SRS transmission frequency band with respect to each serving radio terminal UE2 such that the number of SRS transmission frequency bands overlapping those of other serving radio terminals UE2 is reduced as the setting priority is higher.

Considered is the case in which the setting priorities of the serving radio terminal UE2-1, the serving radio terminal UE2-3, and the serving radio terminal UE2-4 are high and the setting priorities of the serving radio terminal UE2-2 and the serving radio terminal UE2-5 are low. In this case, the SRS transmission frequency band setting unit 112 sets the frequency band 4 (the transmission frequency band of the SRS of the serving radio terminal UE2-2 at the timing of the special subframe 302 in FIG. 9) as a transmission frequency band of SRS of the serving radio terminal UE2-5 at the timing of the special subframe 302 in FIG. 9. Moreover, the SRS transmission frequency band setting unit 112 transmits information on the frequency band 4 as information on the SRS transmission frequency band to the serving radio terminal UE2-5 through the modulation and demodulation unit 107, the radio communication unit 106, and the antenna 108A to the antenna 108D. When the information on the frequency band 4 as the information on the SRS transmission frequency band is received, the serving radio terminal UE2-5 transmits SRS using the frequency band 4 at the timing of the special subframe 302 in FIG. 9.

Moreover, thereafter, considered is the case in which between the timing of the special subframe 302 in FIG. 9 and a timing of a special subframe 303, the serving radio terminal UE2-4 moves out of the cell 3-1 and serves as a non-serving radio terminal.

In this case, the SRS transmission frequency band setting unit 112 detects that no SRS is transmitted using the frequency band 3 from the radio terminal UE2-4 serving as the non-serving radio terminal, at the timing of the special subframe 303, and recognizes that the frequency band 3 is the unset SRS transmission frequency band.

Moreover, the SRS transmission frequency band setting unit 112 sets the frequency band 2 (the unset SRS transmission frequency band) at a timing of a special subframe 304 with respect to the serving radio terminal UE2-5 of the serving radio terminal UE2-2 and the serving radio terminal UE2-5, in which the same SRS transmission frequency band is set, as a transmission frequency band of SRS at the timing of the special subframe 304 in FIG. 9. Moreover, the SRS transmission frequency band setting unit 112 transmits information on the frequency band 2 as information on the SRS transmission frequency band to the serving radio terminal UE2-5 through the modulation and demodulation unit 107, the radio communication unit 106, and the adaptive antenna 108A to the antenna 108D. When the information on the frequency band 2 as the information on the SRS transmission frequency band is received, the serving radio terminal UE2-5 transmits SRS using the frequency band 2 at the timing of the special subframe 304 in FIG. 9.

In the aforementioned first process and second process, when the SRS transmission frequency band setting unit 112 sets the SRS transmission frequency band with respect to each serving radio terminal UE2, the RB assignment unit 114 assigns a downlink resource block to each serving radio terminal UE2. Specifically, the RB assignment unit 114 performs the following process for each serving radio terminal UE2 (target serving radio terminal UE2) which is to be assigned.

That is, the RB assignment unit 114 employs a PF (Proportional Fair) scheme, and determines a frequency band (an assignment candidate frequency band) of a downlink resource block assignable to the target serving radio terminal UE2.

Next, the RB assignment unit 114 determines a timing at which a downlink resource is to be assigned to the target serving radio terminal UE2. Specifically, the RB assignment unit 114 determines a timing of at least one of subframes of downlink resource blocks between a timing of the latest SRS received from the target serving radio terminal UE2 and the end part of a frame including the timing of the SRS (refer to FIG. 7 and FIG. 9).

Next, the RB assignment unit 114 recognizes a frequency band, which was used for the transmission of the received latest SRS, based on the information on the SRS transmission frequency band. Next, the RB assignment unit 114 determines whether the frequency band used for the transmission of the received latest SRS overlaps the assignment candidate frequency band. When the frequency band used for the transmission of the received latest SRS overlaps the assignment candidate frequency band, the RB assignment unit 114 generates an RB assignment value (a downlink RB assignment value) in order to assign a downlink resource block, which corresponds to the determined timing of the subframe and has a frequency band of an overlapping part between the frequency band used for the transmission of the received latest SRS and the assignment candidate frequency band, to the target serving radio terminal UE2 serving as a transmission source of the latest SRS. The downlink RB assignment value is obtained by a process of a medium access control (MAC) layer. Furthermore, the downlink RB assignment value includes a resource block number indicating information for uniquely identifying a time zone and a frequency band of the downlink resource block to be assigned to the target serving radio terminal UE2.

The RB assignment unit 114 outputs the downlink RB assignment value to the modulation and demodulation unit 107. Furthermore, the RB assignment unit 114 transmits the resource block number of the downlink resource block, which is to be assigned to the target serving radio terminal UE2, to the target serving radio terminal UE2 through the modulation and demodulation unit 107, the radio communication unit 106, and the antenna 108A to the antenna 108D.

Then, the control unit 102 calculates an antenna weight (a reception weight), at which a signal-to-interference noise ratio (SINR) at the time of reception of the SRS from the serving radio terminal UE2-1 is maximum, with respect to the antenna 108A to the antenna 108D.

Next, the control unit 102 designates a time zone and a frequency band of a downlink resource block, which is to be assigned to the serving radio terminal UE2-1, based on the downlink RB assignment value generated by the RB assignment unit 114. PDSCH in the designated downlink resource block is PDSCH to which a transmission weight is to be set.

Next, the control unit 102 uses reception weights, which correspond to the antenna 108A to the antenna 108D, as transmission weights of the antenna 108A to the antenna 108D, which correspond to frequency bands of downlink resource blocks to which transmission weights are to be set.

(1.3) Operation of Radio Base Station

Figure 10:
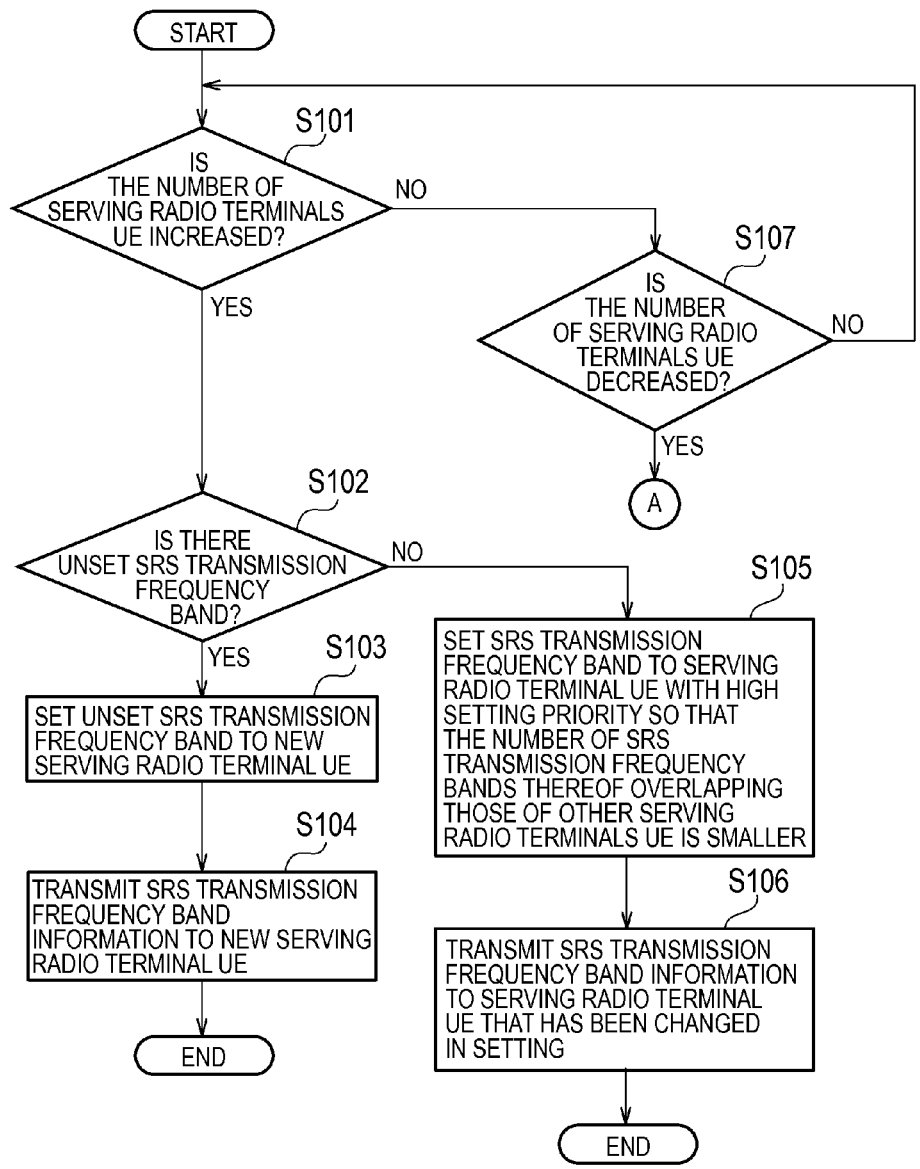
FIG. 10 is a flowchart illustrating a first operation of the radio base station according to the first embodiment of the present invention.
Figure 11:
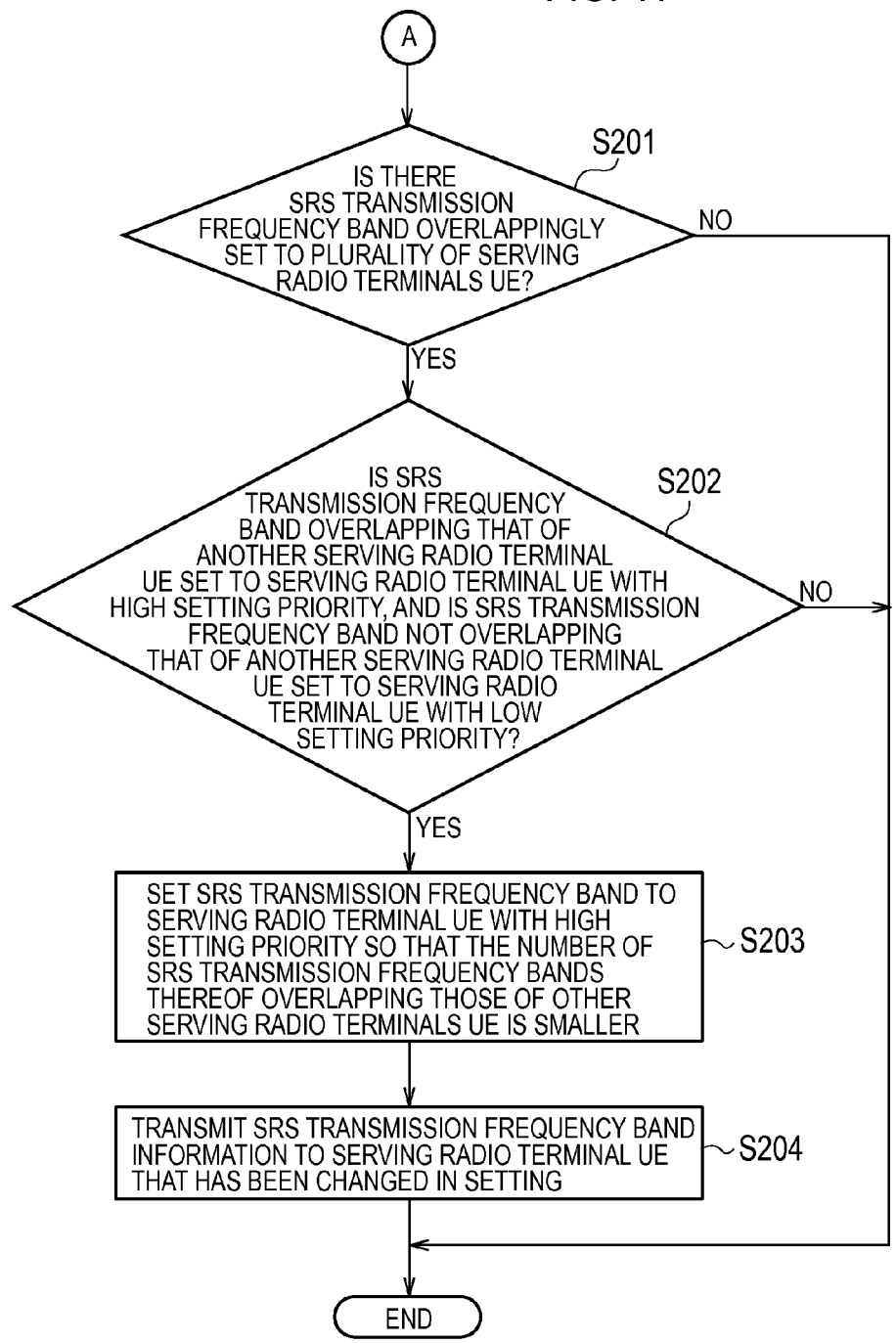
FIG. 11 is a flowchart illustrating a second operation of the radio base station according to the first embodiment of the present invention.

FIG. 10 and FIG. 11 are flowcharts illustrating an operation of the radio base station eNB1-1.

In step S101, the SRS transmission frequency band setting unit 112 of the radio base station eNB1-1 determines whether the number of the serving radio terminals UE2 is increased. Furthermore, when the number of serving radio terminals UE2 is increased, it represents the case in which the radio terminals UE2 enter the cell 3-1 and serve as new serving radio terminals UE2, or the radio terminals UE2 are powered on from off in the cell 3-1 and serve as new serving radio terminals UE2.

When the number of the serving radio terminals UE2 is increased, the SRS transmission frequency band setting unit 112 determines whether there is an unset SRS transmission frequency band in step S102.

When there is the unset SRS transmission frequency band, the SRS transmission frequency band setting unit 112 sets the unset SRS transmission frequency band to the new serving radio terminals UE2 in step S103.

In step S104, the SRS transmission frequency band setting unit 112 transmits information on the set SRS transmission frequency band to the new serving radio terminals UE2.

Meanwhile, when it is determined that there is no unset SRS transmission frequency band in step S102, the SRS transmission frequency band setting unit 112 sets a SRS transmission frequency band to serving radio terminals UE2 with high setting priority such that the number of SRS transmission frequency bands overlapping those of other serving radio terminals UE2 is reduced, in step S105.

In step S106, the SRS transmission frequency band setting unit 112 transmits information on the set SRS transmission frequency band to the serving radio terminals UE2 for which the setting of the SRS transmission frequency band was changed in step S105.

Furthermore, when it is determined that the number of the serving radio terminals UE2 is not increased in step S101, the SRS transmission frequency band setting unit 112 determines whether the number of the serving radio terminals UE2 is decreased in step S107. Furthermore, when the number of the serving radio terminals UE2 is decreased, it represents the case in which the radio terminals UE2 moves out of the cell 3-1 and serves as non-serving radio terminals UE2, or the radio terminals UE2 are powered off from on in the cell 3-1 and serve as non-serving radio terminals UE2. In the case of negative determination in step S107, the operations after step S101 are repeated.

Meanwhile, when the number of the serving radio terminals UE2 is decreased, operations illustrated in FIG. 11 are performed. In step S201, the SRS transmission frequency band setting unit 112 determines whether there is a SRS transmission frequency band overlappingly set to a plurality of the serving radio terminals UE2. In the case of negative determination in step S201, a series of operations are ended.

Meanwhile, when there is the SRS transmission frequency band overlappingly set to the plurality of serving radio terminals UE2, the SRS transmission frequency band setting unit 112 determines whether SRS transmission frequency bands overlapping those of other serving radio terminals UE2 are set to serving radio terminals UE2 with high setting priority, and SRS transmission frequency bands not overlapping those of other serving radio terminals UE2 are set to serving radio terminals UE2 with low setting priority, in step S202. In the case of negative determination in step S202, a series of operations are ended.

When it is determined that the SRS transmission frequency bands overlapping those of other serving radio terminals UE2 is set to the serving radio terminals UE2 with high setting priority, and the SRS transmission frequency bands not overlapping those of other serving radio terminals UE2 is set to the serving radio terminals UE2 with low setting priority in step S202, the SRS transmission frequency band setting unit 112 sets the SRS transmission frequency bands to the serving radio terminals UE2 with high setting priority such that the number of SRS transmission frequency bands overlapping those of other serving radio terminals UE2 is reduced, in step S203.

In step S204, the SRS transmission frequency band setting unit 112 transmits information on the set SRS transmission frequency band to the serving radio terminals UE2 for which the setting of the SRS transmission frequency band was changed in step S203.

(1.4) Operation and Effect

As described above, according to the first embodiment, the radio base station eNB1-1 sets, to each serving radio terminal UE2, different frequency bands (SRS transmission frequency bands) that are used when the serving radio terminal UE2 transmits SRS at a timing of a predetermined special subframe.

The serving radio terminal UE2 uses a frequency hopping scheme, and transmits the SRS at each special subframe timing while switching the SRS transmission frequency band. Furthermore, a common switching sequence is applied to each serving radio terminal UE2. Accordingly, different SRS transmission frequency bands at the timing of the predetermined special subframe are set to each serving radio terminal UE2, so that SRS transmission frequency bands at each special subframe are different for each serving radio terminal UE2.

Accordingly, each serving radio terminal UE2 is able to transmit SRS using different frequency bands at the timing of each special subframe. Thus, when the radio base station eNB1-1 assigns a downlink resource block, which has a frequency band equal to a frequency band used for the transmission of the latest received SRS, to the serving radio terminal UE2 serving as a transmission source of the latest received SRS, a frequency band that is used in the transmission of the SRS is not concentrated on a specific frequency band, and although there is a vacancy in the downlink resource block, a use efficiency of the downlink resource block is not deteriorated due to the concentrated assignment of the downlink resource block of a specific frequency band to a plurality of radio terminals UE. Consequently, it is possible to improve the use efficiency of the downlink resource block.

Furthermore, according to the first embodiment, when a new serving radio terminal UE2 is generated, the radio base station eNB1-1 sets an unset SRS transmission frequency band to the new serving radio terminal UE2. Consequently, it is possible to distribute and set SRS transmission frequency bands of each serving radio terminal.

Furthermore, according to the first embodiment, when a new serving radio terminal UE2 is generated and there is no unset SRS transmission frequency band, the radio base station eNB1-1 sets a SRS transmission frequency band to a serving radio terminal UE2 with high setting priority such that the number of SRS transmission frequency bands overlapping those of other serving radio terminals UE2 is reduced. Consequently, it is possible to favorably maintain a communication state of the serving radio terminal UE2 with high setting priority to a maximum extent.

Furthermore, according to the first embodiment, when the serving radio terminal UE2 is a non-serving radio terminal, SRS transmission frequency bands overlapping those of other serving radio terminals UE2 are set to the serving radio terminals UE2 with high setting priority, and SRS transmission frequency bands not overlapping those of other serving radio terminals UE2 are set to serving radio terminals UE2 with low setting priority, the radio base station eNB1-1 sets a SRS transmission frequency band to the serving radio terminal UE2 with high setting priority such that the number of SRS transmission frequency bands overlapping those of other serving radio terminals UE2 is reduced. Consequently, it is possible to favorably maintain a communication state of the serving radio terminal UE2 with high setting priority to a maximum extent.

(1.5) Other Embodiments

Thus, the present invention has been described with the embodiment. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiments, the setting priority had two levels of high and low. However, the setting priority may have three levels or more.

In the aforementioned embodiments, the timing of the special subframe was used as the transmission timing of SRS in the serving radio terminal UE2-1. However, the transmission timing of the SRS is not limited thereto, and it is sufficient if the transmission timing is a timing agreed in advance between the radio base station eNB1-1 and the serving radio terminal UE2. However, it is preferable that the transmission timing of the SRS exists once in a time of at least one frame.

Furthermore, in the aforementioned embodiments, the radio base station eNB1-1 used the reception weight as the transmission weight. However, the transmission weight may be calculated independently of the reception weight.

In the aforementioned embodiments, the TDD-LTE radio communication system was described. However, the present invention can be applied in the same manner to all types of radio communication systems in which asymmetric radio communication in which a frequency band of an uplink radio signal to be assigned to a radio terminal is different from a frequency band of a downlink radio signal is employed.

Thus, it must be understood that the present invention includes various embodiments that are not described herein. Therefore, the present invention is limited only by the specific features of the invention in the scope of the claims reasonably evident from the disclosure above.

[Second Embodiment]

Next, a second embodiment of the present invention will be described with reference to the drawings. Specifically, the second embodiment will be described in sequence of (2.1) Configuration of radio communication system, (2.2) Configuration of radio base station, (2.3) Operation of radio base station, (2.4) Operation and effect, and (2.5) Other embodiments. It is to be noted that the same or similar reference numerals are applied to the same or similar parts through the drawings in the following embodiments.

(2.1) Configuration of Radio Communication System

Figure 12:
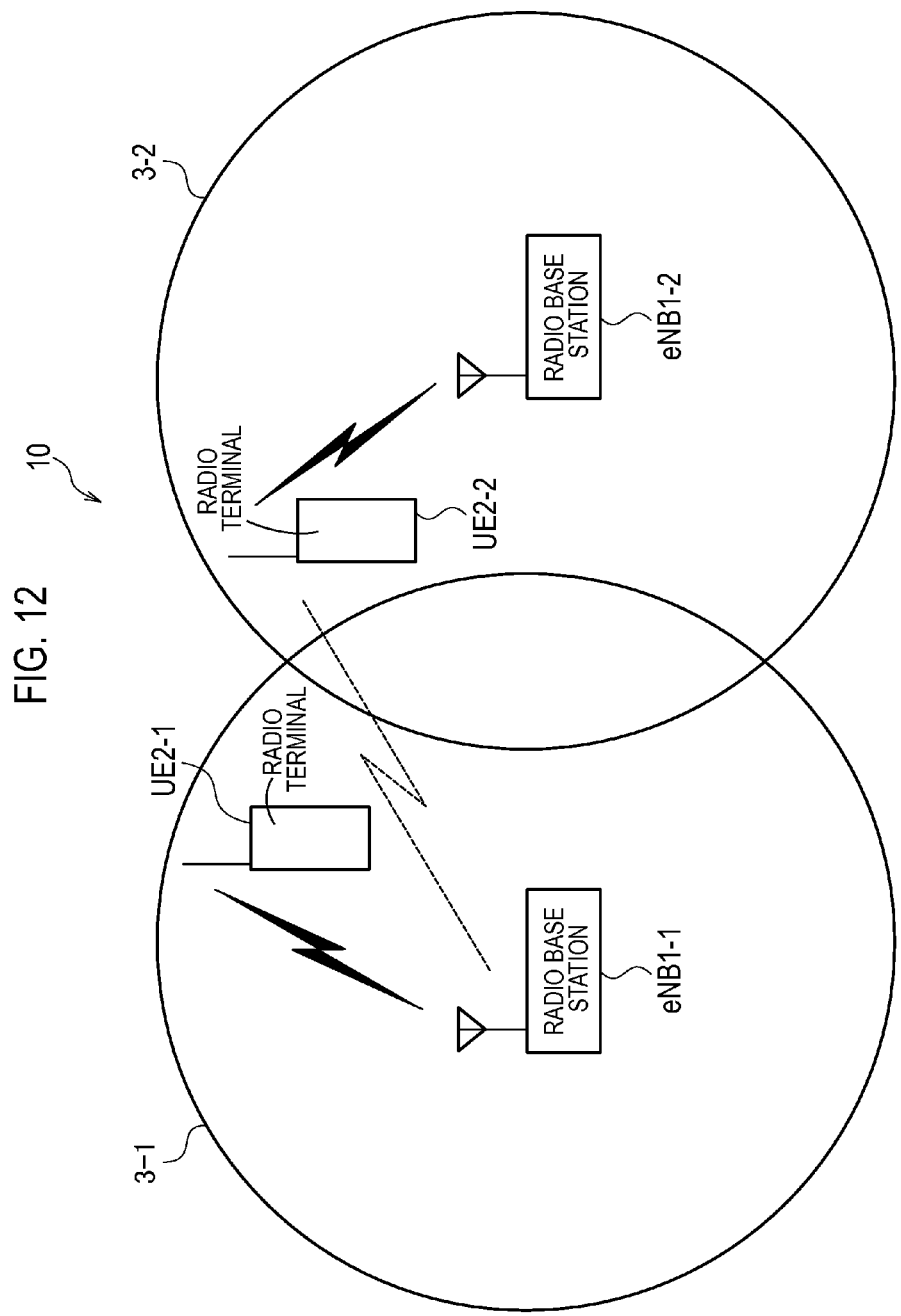
FIG. 12 is an entire schematic configuration diagram of a radio communication system according to a second embodiment of the present invention.

FIG. 12 is an entire schematic configuration diagram of the radio communication system 10 according to the second embodiment of the present invention.

The radio communication system 10 illustrated in FIG. 12 is a TDD-LTE radio communication system. The radio communication system 10 includes the radio base station eNB1-1, a radio base station eNB1-2, the radio terminal UE2-1, and the radio terminal UE2-2.

In FIG. 12, the radio base station eNB1-1 and the radio base station eNB1-2 constitute E-UTRAN (Evolved-UMTS Terrestrial Radio Access Network). The radio terminal UE2-1 exists in the cell 3-1 that is a communication available area provided by the radio base station eNB1-1. The radio terminal UE2-2 exists in a cell 3-2 that is a communication available area provided by the radio base station eNB1-2.

The radio terminal UE2-1 is a terminal to which a resource block is assigned by the radio base station eNB1-1. Meanwhile, the radio terminal UE2-2 is not a terminal to which the resource block is assigned by the radio base station eNB1-1. In this case, when the radio base station eNB1-1 is set as a reference, the radio terminal UE2-1 is a serving radio terminal and the radio terminal UE2-2 is a non-serving radio terminal.

Time division duplex is employed in radio communication between the radio base station eNB1-1 and the radio terminal UE2-1 and radio communication between the radio base station eNB1-2 and the radio terminal UE2-2, OFDMA (Orthogonal Frequency Division Multiplexing Access) is employed in downlink radio communication, and SC-FDMA (Single Carrier Frequency Division Multiple Access) is employed in uplink radio communication. Furthermore, downlink indicates a direction from the radio base station eNB1-1 to the radio terminal UE2-1 and a direction from the radio base station eNB1-2 to the radio terminal UE2-2. Uplink indicates a direction from the radio terminal UE2-1 to the radio base station eNB1-1 and a direction from the radio terminal UE2-2 to the radio base station eNB1-2.

The radio base station eNB1-1 assigns a resource block (RB) as a radio resource to the radio terminal UE2-1 in the cell 3-1. Similarly, the radio base station eNB1-2 assigns a resource block (RB) to the radio terminal UE2-2 in the cell 3-2.

The resource block includes a downlink resource block (downlink RB) to be used in the downlink radio communication and an uplink resource block (uplink RB) to be used in the uplink radio communication. A plurality of downlink resource blocks are arranged in the frequency direction and the time direction. Similarly, a plurality of uplink resource blocks are arranged in the frequency direction and the time direction.

Figure 13:
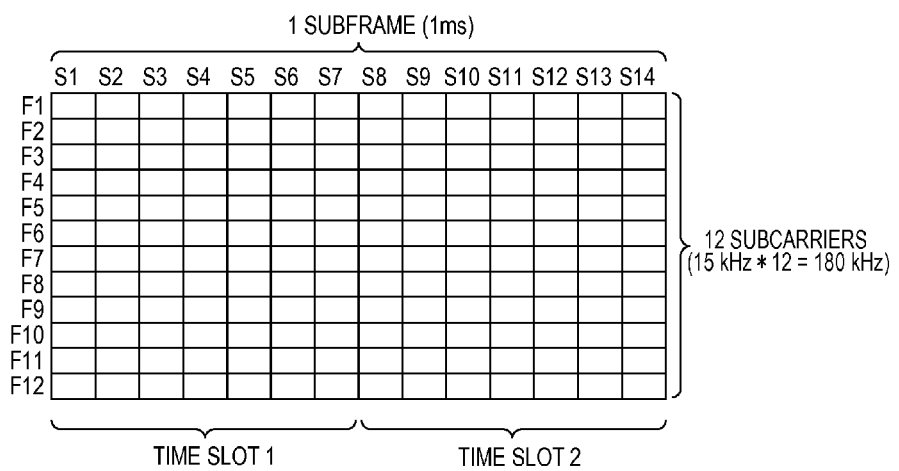
FIG. 13 is a diagram illustrating a format of a resource block according to the second embodiment of the present invention.

FIG. 13 is a diagram illustrating a format of the resource block. As illustrated in FIG. 13, the resource block is configured in one subframe having a time length of 1 [ms] in the time direction. The subframe includes a time zone 51 to a time zone S14. Among the time zone 51 to the time zone S14, the time zone 51 to the time zone S7 constitute a first half time slot (a time slot 1) and the time zone S8 to the time zone S14 constitute a latter half time slot (a time slot 2).

As illustrated in FIG. 13, the resource block has a frequency bandwidth of 180 [kHz] in the frequency direction. Furthermore, the resource block includes 12 subcarriers F1 to F12 having a frequency bandwidth of 15 [kHz].

Figure 14:
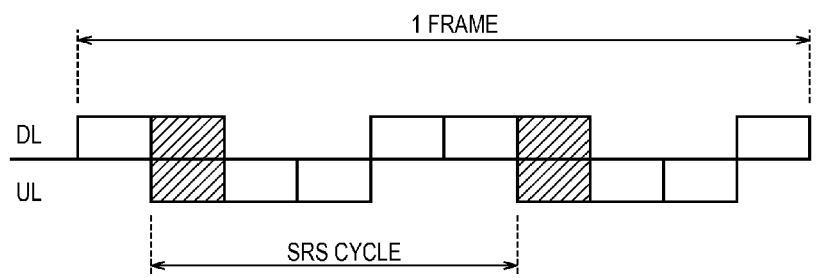
FIG. 14 is a diagram illustrating a format of a frame according to the second embodiment of the present invention.

Furthermore, in the time direction, a plurality of subframes constitute one frame. FIG. 14 is a diagram illustrating a format of the frame. The frame illustrated in FIG. 14 includes 10 subframes. The frame includes 10 subframes in the sequence of a subframe of a downlink resource block, subframes (special subframes: SSF) of both the downlink resource block and an uplink resource block, a subframe of the uplink resource block, a subframe of the uplink resource block, a subframe of the downlink resource block, a subframe of the downlink resource block, a special subframe, a subframe of the uplink resource block, a subframe of the uplink resource block, and a subframe of the downlink resource block.

Figure 15:
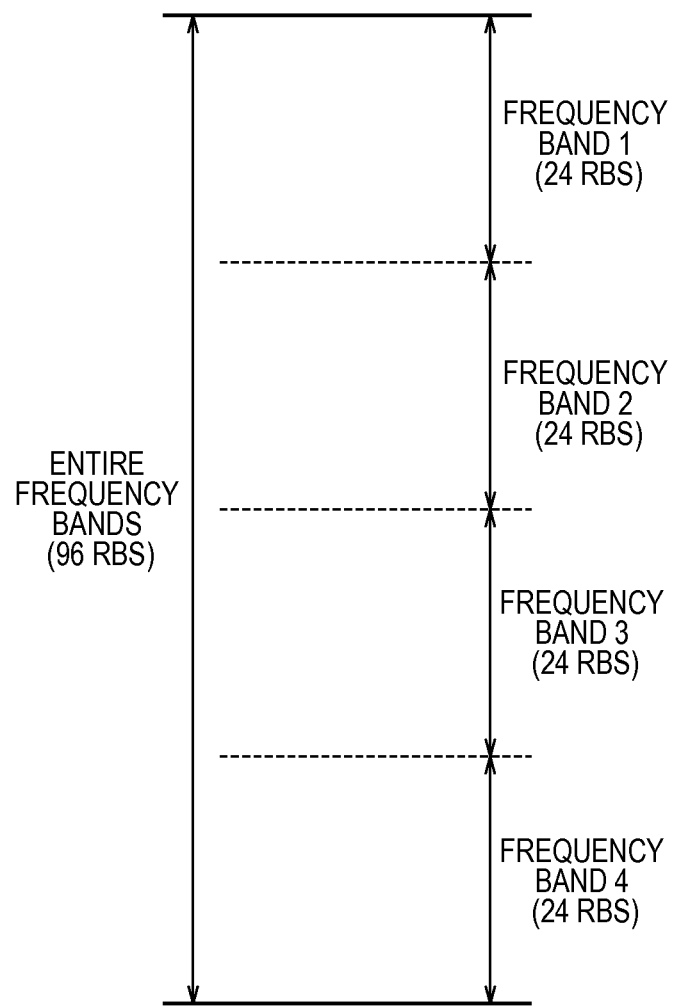
FIG. 15 is a diagram illustrating a configuration of an entire frequency band available in radio communication between a radio base station and a radio terminal according to the second embodiment of the present invention.

Furthermore, in the frequency direction, an entire frequency band available in the radio communication between one radio base station eNB and one radio terminal UE has bands corresponding to a plurality of resource blocks. Furthermore, the entire frequency band is divided into frequency bands corresponding to multiples of four of the number of the resource blocks. FIG. 15 is a diagram illustrating a configuration of the entire frequency band available in the radio communication between the one radio base station eNB and one radio terminal UE. As illustrated in FIG. 15, the entire frequency band available in the radio communication between one radio base station eNB and one radio terminal UE has bands corresponding to 96 resource blocks. Furthermore, the entire frequency band is divided into a frequency band 1 to a frequency band 4, each of which has bands corresponding to 24 resource blocks.

The downlink resource block includes a control information channel (PDCCH: Physical Downlink Control CHannel) for transmitting downlink control information, and a shared data channel (PDSCH: Physical Downlink Shared CHannel) for transmitting downlink user data in the time direction.

Meanwhile, the uplink resource block includes a control information channel (PUCCH: Physical Uplink Control CHannel) for transmitting uplink control information at both ends of an entire frequency band available in the uplink radio communication, and a shared data channel (PUSCH: Physical Uplink Shared CHannel) for transmitting uplink user data at the center part thereof.

(2.2) Configuration of Radio Base Station

Figure 16:
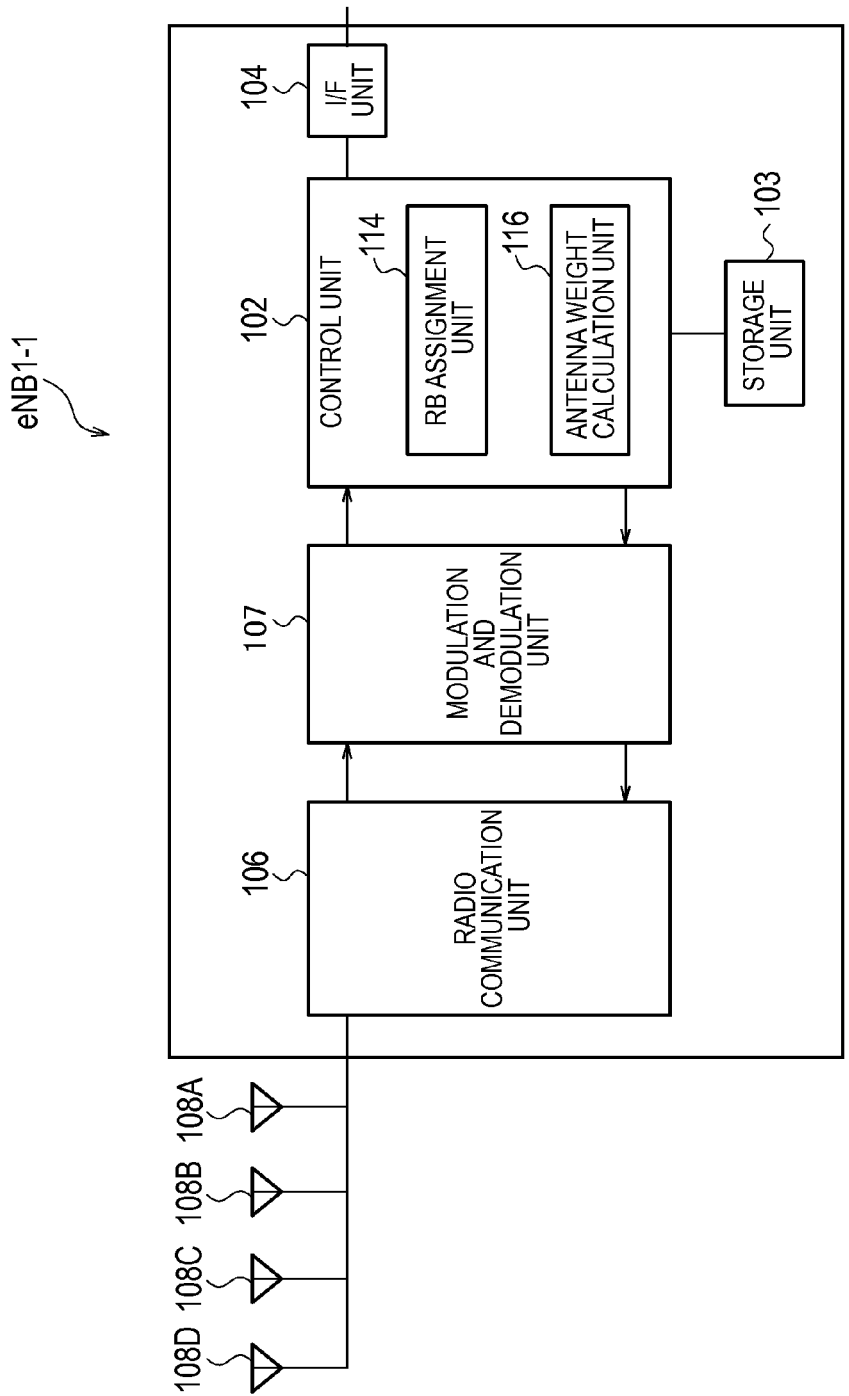
FIG. 16 is a configuration diagram of the radio base station according to the second embodiment of the present invention.

FIG. 16 is a configuration diagram of the radio base station eNB1-1. In addition, the radio base station eNB1-2 also has the same configuration as that of the radio base station eNB1-1. As illustrated in FIG. 16, the radio base station eNB1-1 is a radio base station of an adaptive array scheme for applying an antenna weight to a plurality of antennas, and includes the control unit 102, the storage unit 103, the I/F unit 104, the radio communication unit 106, the modulation and demodulation unit 107, the antenna 108A, the antenna 108B, the antenna 108C, and the antenna 108D.

The control unit 102, for example, is configured by a CPU, and controls various functions of the radio base station eNB1-1. The control unit 102 includes the RB assignment unit 114 and an antenna weight calculation unit 116. The storage unit 103, for example, is configured by a memory, and stores various types of information used for the control and the like of the radio base station eNB1-1. The I/F unit 104 is able to communicate with another radio base station eNB through an X1 interface. Furthermore, the I/F unit 104 is able to communicate with EPC (Evolved Packet Core), specifically, MME (Mobility Management Entity)/S-GW (Serving Gateway), through an S1 interface.

(2.2.1) First Process

When the serving radio terminal UE2-1 transmits a sounding reference signal (first SRS), the following first process is performed.

The serving radio terminal UE2-1 uses a frequency hopping scheme, and transmits the first SRS while switching a frequency band that is used for the transmission of the first SRS. Furthermore, the serving radio terminal UE2-1 transmits the first SRS at a timing of a special subframe. The first SRS is an uplink radio signal of a radio frequency band.

For example, as illustrated in FIG. 15, when an entire frequency band is divided into the frequency band 1 to the frequency band 4, the serving radio terminal UE2-1 transmits the first SRS while switching the frequency band 1 to the frequency band 4 in a predetermined order. Furthermore, when a frame has a format illustrated in FIG. 14, the serving radio terminal UE2-1 transmits the first SRS twice in a time of one frame. In addition, the radio base station eNB1-1 transmits instruction information for instructing in advance a transmission timing of the first SRS to the serving radio terminal UE2-1. The serving radio terminal UE2-1 sets the transmission timing of the first SRS, based on the received instruction information. In this way, the transmission timing of the first SRS is determined in advance. Accordingly, the radio base station eNB1-1 is able to distinguish the first SRS from another radio signal (for example, second SRS which will be described later), based on a reception timing.

(2.2.1.1) Process at Time of Reception of First SRS

In the first process, at the time of the reception of the first SRS, the following process is performed. That is, the radio communication unit 106 receives the first SRS, which is transmitted from the serving radio terminal UE2-1, through the antenna 108A to the antenna 108D. The radio communication unit 106 detects a frequency band used for the transmission of the received first SRS, and outputs information (first SRS frequency band information) on the frequency band to the RB assignment unit 114 of the control unit 102.

Furthermore, the radio communication unit 106 has a low noise amplifier (LNA; not illustrated) and a mixer (not illustrated) therein. The radio communication unit 106 amplifies the received first SRS and converts (down-converts) the amplified SRS to a baseband signal. Moreover, the radio communication unit 106 outputs the baseband signal to the modulation and demodulation unit 107.

The RB assignment unit 114 of the control unit 102 generates an assignment value (uplink RB assignment value) of an uplink resource block, which is obtained by a process of a medium access control (MAC) layer. The uplink RB assignment value includes a resource block number indicating information for uniquely identifying a time zone and a frequency band of an uplink resource block already assigned to the serving radio terminal UE2-1. The RB assignment unit 114 outputs the uplink RB assignment value to the modulation and demodulation unit 107.

The modulation and demodulation unit 107 removes CP (Cyclic Prefix) from the input baseband signal. The CP indicates duplication of an end part of an OFDM symbol, and is included in a period of a guard interval provided in order to suppress inter-symbol interference occurring by a multi-path. The modulation and demodulation unit 107 performs fast Fourier transform on the baseband signal having no CP, thereby obtaining a frequency domain signal. The frequency domain signal is output to the antenna weight calculation unit 116 of the control unit 102.

When the frequency domain signal is input from the modulation and demodulation unit 107, the antenna weight calculation unit 116 calculates antenna weights (reception weights), at which a signal-to-interference noise ratio (SINR) at the time of reception of the uplink radio signal from the serving radio terminal UE2-1 is maximum, with respect to the antenna 108A to the antenna 108D, based on the frequency domain signal.

Specifically, the antenna weight calculation unit 116 designates a time zone and a frequency band of an uplink resource block, which is assigned to the serving radio terminal UE2-1, based on the uplink RB assignment value generated by the RB assignment unit 114. Moreover, the antenna weight calculation unit 116 calculates reception weights of the antenna 108A to the antenna 108D, which correspond to a frequency band of PUSCH in the uplink resource block assigned to the serving radio terminal UE2-1, based on a frequency domain signal which corresponds to the designated frequency band of the uplink resource block. Moreover, the antenna weight calculation unit 116 stores the calculated reception weights in the storage unit 103 together with information on a corresponding frequency band and information (time stamp information) on a current time.

The modulation and demodulation unit 107 performs a channel equalization process for the acquired frequency domain signal. Next, the modulation and demodulation unit 107 performs inverse discrete Fourier transform on the signal on which the channel equalization process has been performed. Next, the modulation and demodulation unit 107 performs a demodulation and decoding process for the signal on which the inverse discrete Fourier transform has been performed. In this way, data included in the first SRS transmitted by the radio terminal UE2-1 is obtained. The data is output to the control unit 102.

The RB assignment unit 114 of the control unit 102 assigns a downlink resource block to the serving radio terminal UE2-1.

Specifically, the RB assignment unit 114 employs a PF (Proportional Fair) scheme, and determines a frequency band (an assignment candidate frequency band) of a downlink resource block assignable to the serving radio terminal UE2-1.

Next, the RB assignment unit 114 determines a timing at which a downlink resource is to be assigned to the serving radio terminal UE2-1. Specifically, the RB assignment unit 114 determines a timing of at least one of subframes of downlink resource blocks between a timing of the received latest first SRS and the end part of a frame including the timing of the first SRS. Alternatively, the RB assignment unit 114 determines a timing of at least one of subframes of downlink resources blocks between the timing of the received latest first SRS and a timing at which first SRS having a frequency band equal to the first SRS and positioned next to the first SRS is considered to be received.

Next, the RB assignment unit 114 recognizes a frequency band, which was used for the transmission of the received latest first SRS, based on the information on the first SRS transmission frequency band. Next, the RB assignment unit 114 determines whether the frequency band used for the transmission of the received latest first SRS overlaps the assignment candidate frequency band. When the frequency band used for the transmission of the received latest first SRS overlaps the assignment candidate frequency band, the RB assignment unit 114 generates an RB assignment value (a downlink RB assignment value) in order to assign a downlink resource block, which corresponds to the determined timing of the subframe and has a frequency band of an overlapping part between the frequency band used for the transmission of the received latest first SRS and the assignment candidate frequency band, to the serving radio terminal UE2-1 serving as a transmission source of the received latest first SRS. The downlink RB assignment value is obtained by a process of the medium access control (MAC) layer, similarly to the aforementioned uplink RB assignment value. Furthermore, the downlink RB assignment value includes a resource block number indicating information for uniquely identifying a time zone and a frequency band of the downlink resource block to be assigned to the serving radio terminal UE2-1.

The RB assignment unit 114 outputs the downlink RB assignment value to the modulation and demodulation unit 107. Furthermore, the RB assignment unit 114 transmits the resource block number of the downlink resource block, which is to be assigned to the serving radio terminal UE2-1, to the serving radio terminal UE2-1 through the modulation and demodulation unit 107, the radio communication unit 106, and the antenna 108A to the antenna 108D.

Figure 17:
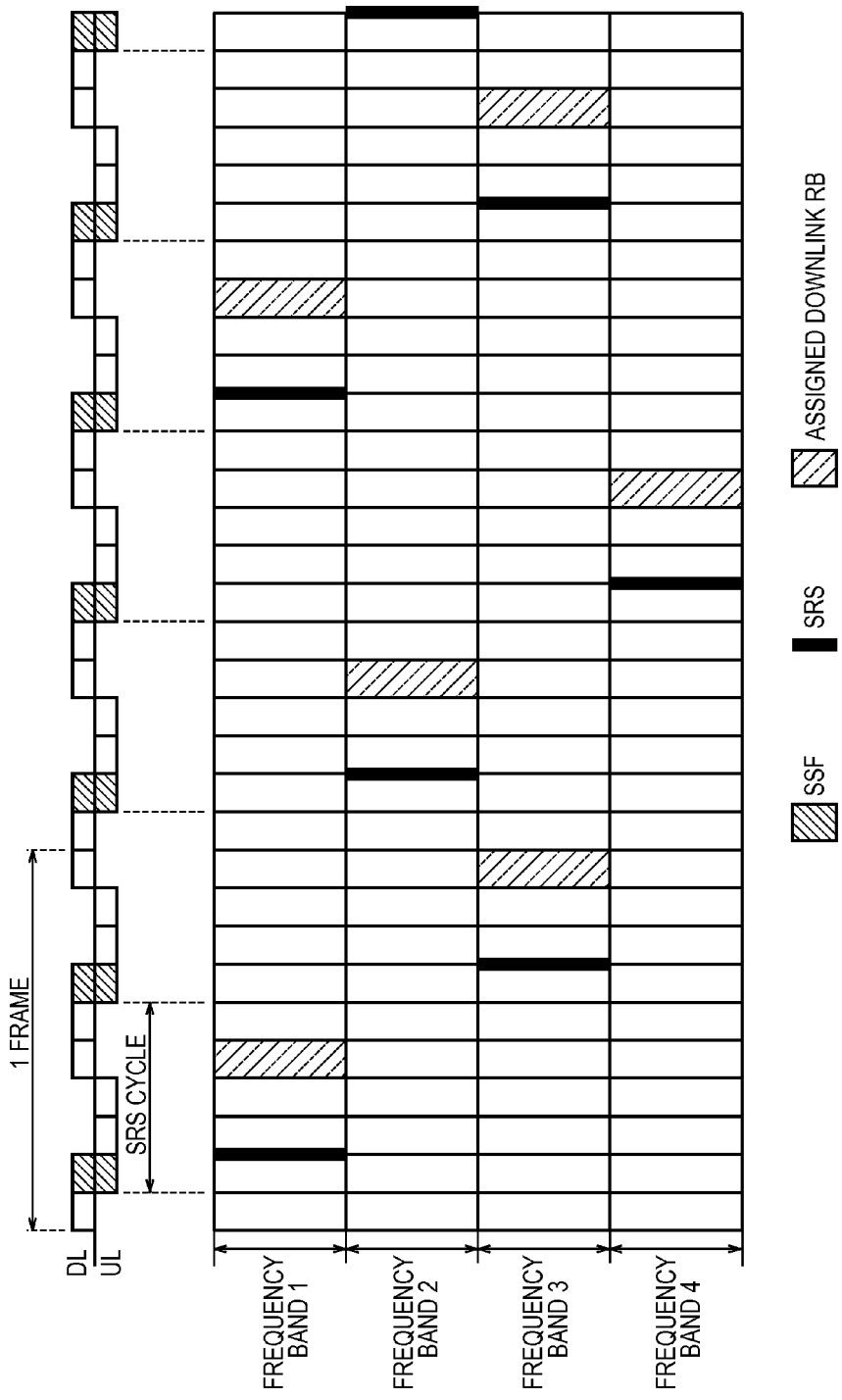
FIG. 17 is a diagram illustrating a first example of correspondence between SRS and assigned downlink RB according to the second embodiment of the present invention.
Figure 18:
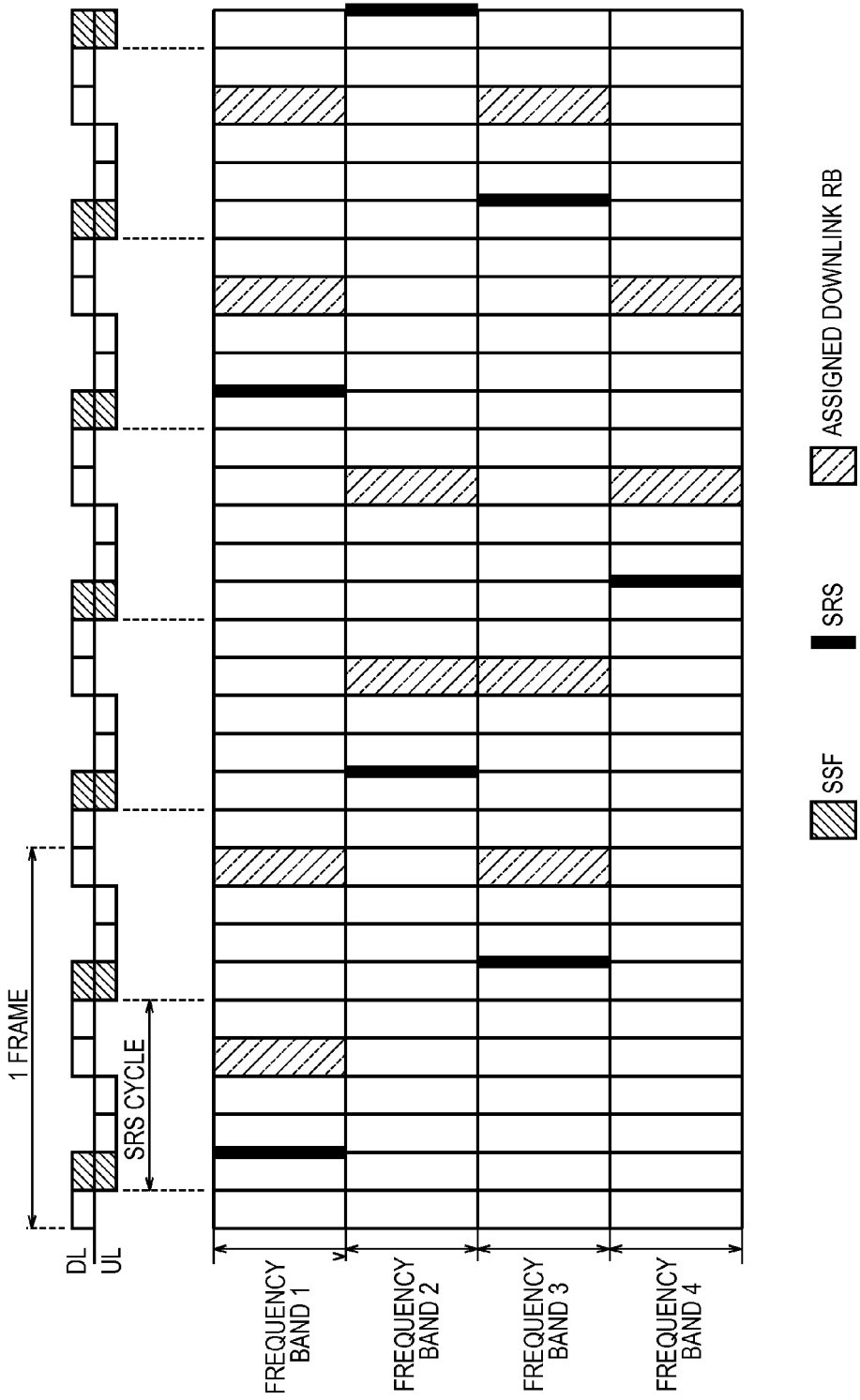
FIG. 18 is a diagram illustrating a second example of the correspondence between SRS and assigned downlink RB according to the second embodiment of the present invention.

FIG. 17 and FIG. 18 are diagrams illustrating an example of correspondence between SRS and assigned downlink resource blocks.

In FIG. 17, the radio terminal UE2-1 transmits first SRS while switching a frequency band at the time of transmission to the frequency band 1 to the frequency band 4. The radio base station eNB1-1 assigns a downlink resource block having a frequency band used for the transmission of the first SRS to the radio terminal UE2-1 at a timing of a subframe of a downlink resource block after a reception timing, which is in a frame including the reception timing of the first SRS, preferentially to a downlink resource block having another frequency band.

Furthermore, in FIG. 18, the radio terminal UE2-1 transmits first SRS while switching a frequency band at the time of transmission to the frequency band 1 to the frequency band 4. The radio base station eNB1-1 assigns a downlink resource block having a frequency band used for the transmission of the first SRS to the radio terminal UE2-1 at a timing of a subframe of a downlink resource block between a reception timing of the first SRS and a timing, at which first SRS having a frequency band equal to the first SRS and positioned next to the first SRS is considered to be received, preferentially to a downlink resource block having another frequency band.

(2.2.1.2) Process at Time of Transmission of Downlink Radio Signal to Serving Radio Terminal UE2-1

Then, a downlink radio signal is transmitted to the serving radio terminal UE2-1. That is, when data from the control unit 102 is input, the modulation and demodulation unit 107 performs encoding and modulation for the data, thereby obtaining a frequency domain signal.

The antenna weight calculation unit 116 calculates antenna weights (transmission weights) at the time of transmission of a downlink radio signal to the serving radio terminal UE2-1 with respect to the antenna 108A to the antenna 108D using the downlink resource block assigned to the serving radio terminal UE2-1.

Specifically, the antenna weight calculation unit 116 designates a time zone and a frequency band of a downlink resource block, which is to be assigned to the serving radio terminal UE2-1, based on the downlink RB assignment value from the RB assignment unit 114. PDSCH in the designated downlink resource block is PDSCH to which a transmission weight is to be set.

Next, the antenna weight calculation unit 116 designates a reception weight, at which the latest time is indicated by the time stamp information and a corresponding frequency band includes a frequency band of a downlink resource block to be assigned to the serving radio terminal UE2-1, among the reception weights corresponding to the antenna 108A to the antenna 108D. Moreover, the antenna weight calculation unit 116 uses the designated reception weights of the antenna 108A to the antenna 108D as transmission weights of the antenna 108A to the antenna 108D, which correspond to frequency bands of downlink resource blocks to which transmission weights are to be set.

The designated reception weights of the antenna 108A to the antenna 108D are antenna weights at which SINR is maximum at the time of reception of the uplink radio signal from the serving radio terminal UE2-1. Accordingly, the reception weights are set as the transmission weights, so that the transmission weights are antenna weights at which a desired wave direction of a beam is directed to the serving radio terminal UE2-1.

The modulation and demodulation unit 107 performs a weighting process of synthesizing the transmission weights calculated by the antenna weight calculation unit 116 and the frequency domain signal. The modulation and demodulation unit 107 performs inverse fast Fourier transform on the frequency domain signal having undergone the weighting process, thereby obtaining a baseband signal. Moreover, the modulation and demodulation unit 107 adds CP to the baseband signal and outputs the baseband signal with the CP to the radio communication unit 106.

The radio communication unit 106 converts (up-converts) the baseband signal with the CP to a downlink radio signal of a radio frequency band. Moreover, the radio communication unit 106 amplifies the downlink radio signal of the radio frequency band, and transmits the amplified downlink radio signal in the radio frequency band through the antenna 108A to the antenna 108D.

(2.2.2) Second Process

When the non-serving radio terminal UE2-2 transmits a sounding reference signal (second SRS) and the radio base station eNB1-1 receives the second SRS, the following second process is performed.

(2.2.2.1) Process at time of reception of second SRS

The non-serving radio terminal UE2-2 uses a frequency hopping scheme, and transmits second SRS while switching a frequency band that is used for the transmission of the second SRS.

The radio communication unit 106 receives the first SRS transmitted from the serving radio terminal UE2-1, and the second SRS transmitted from the non-serving radio terminal UE2-2 through the antenna 108A to the antenna 108D.

Furthermore, the radio communication unit 106 amplifies the received first SRS and converts (down-converts) the amplified first SRS to a baseband signal. Moreover, the radio communication unit 106 outputs the baseband signal to the modulation and demodulation unit 107. Similarly, the radio communication unit 106 amplifies the received second SRS and converts (down-converts) the amplified second SRS to a baseband signal. Moreover, the radio communication unit 106 outputs the baseband signal to the modulation and demodulation unit 107.

The modulation and demodulation unit 107 and the antenna weight calculation unit 116 perform the same process as that at the time of the reception of the first SRS in the aforementioned first process with respect to the first SRS and the second SRS. However, the antenna weight calculation unit 116 calculates an antenna weight (a reception weight) at which SINR at the time of the reception of the uplink radio signal from the serving radio terminal UE2-1 is maximum and SINR at the time of the reception of the uplink radio signal from the non-serving radio terminal UE2-2 is minimum.

The control unit 102 receives data included in the first SRS from the modulation and demodulation unit 107. Furthermore, the control unit 102 receives data included in the second SRS from the modulation and demodulation unit 107.

(2.2.2.2) Process at Time of Transmission of Downlink Radio Signal to Serving Radio Terminal UE2-1

Then, the modulation and demodulation unit 107 and the antenna weight calculation unit 116 perform the same process as the first process. That is, when data from the control unit 102 is input, the modulation and demodulation unit 107 performs encoding and modulation for the data, thereby obtaining a frequency domain signal.

The antenna weight calculation unit 116 calculates antenna weights (transmission weights) at the time of transmission of a downlink radio signal to the serving radio terminal UE2-1 with respect to the antenna 108A to the antenna 108D using the downlink resource block assigned to the serving radio terminal UE2-1.

Specifically, similarly to the first process, the antenna weight calculation unit 116 designates a time zone and a frequency band of a downlink resource block, which is to be assigned to the serving radio terminal UE2-1, based on the downlink RB assignment value from the RB assignment unit 114. PDSCH in the designated downlink resource block is PDSCH to which a transmission weight is to be set.

Next, the antenna weight calculation unit 116 designates a reception weight, at which the latest time is indicated by the time stamp information and a corresponding frequency band includes a frequency band of a downlink resource block to be assigned to the serving radio terminal UE2-1, among the reception weights corresponding to the antenna 108A to the antenna 108D. Moreover, the antenna weight calculation unit 116 uses the designated reception weights of the antenna 108A to the antenna 108D as transmission weights of the antenna 108A to the antenna 108D, which correspond to frequency bands of downlink resource blocks to which transmission weights are to be set.

The designated reception weights of the antenna 108A to the antenna 108D are antenna weights at which SINR is maximum at the time of the reception of the uplink radio signal from the serving radio terminal UE2-1 and SINR at the time of the reception of the uplink radio signal from the non-serving radio terminal UE2-2 is minimum. Accordingly, the reception weights are set as the transmission weights, so that the transmission weights are antenna weights at which a desired wave direction of a beam is directed to the serving radio terminal UE2-1 and a null direction of the beam is directed to the non-serving radio terminal UE2-2.

The modulation and demodulation unit 107 performs a weighting process of synthesizing the transmission weights calculated by the antenna weight calculation unit 116 and the frequency domain signal. The modulation and demodulation unit 107 performs inverse fast Fourier transform on the frequency domain signal having undergone the weighting process, thereby obtaining a baseband signal. Moreover, the modulation and demodulation unit 107 adds CP to the baseband signal and outputs the baseband signal with the CP to the radio communication unit 106.

The radio communication unit 106 converts (up-converts) the baseband signal with the CP to a downlink radio signal of a radio frequency band. Moreover, the radio communication unit 106 amplifies the downlink radio signal of the radio frequency band, and transmits the amplified downlink radio signal in the radio frequency band through the antenna 108A to the antenna 108D.

(2.3) Operation of Radio Base Station

Figure 19:
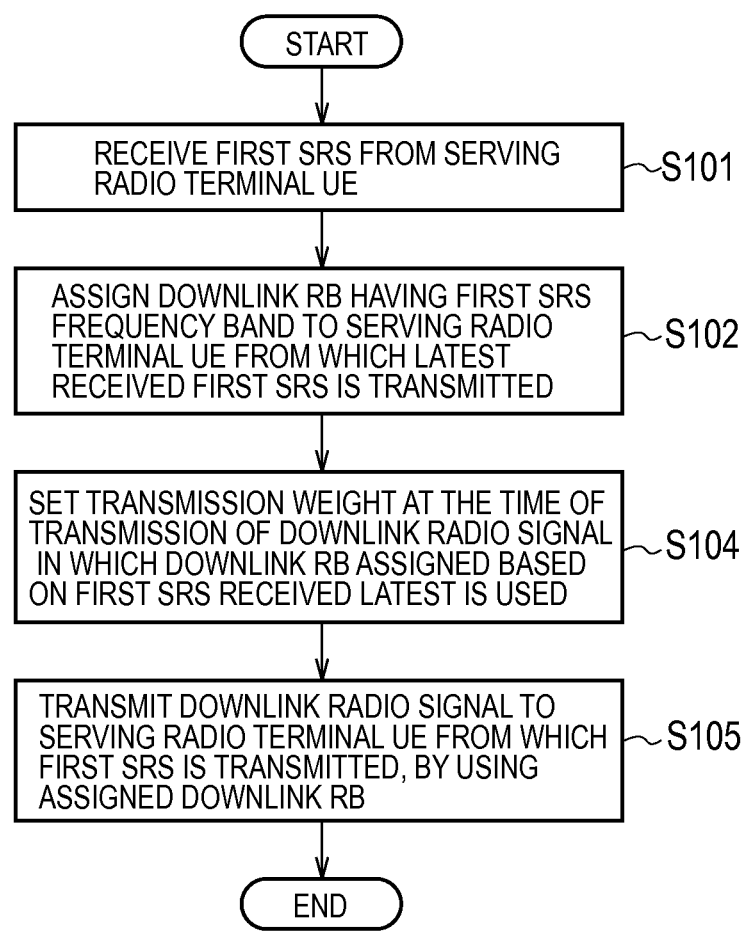
FIG. 19 is a flowchart illustrating a first operation of the radio base station according to the second embodiment of the present invention.

FIG. 19 is a flowchart illustrating a first operation of the radio base station eNB1-1. The flowchart illustrated in FIG. 19 corresponds to the case in which the aforementioned first process is performed.

In step S101, the radio base station eNB1-1 receives first SRS from the serving radio terminal UE2-1.

In step S102, the radio base station eNB1-1 assigns a downlink resource block having a frequency band used for the transmission of the first SRS to the serving radio terminal UE2-1 serving as a transmission source of the latest received first SRS.

In step S104, based on the latest received first SRS, the radio base station eNB1-1 sets a transmission weight at the time of transmission of a downlink radio signal using the downlink resource block assigned to the serving radio terminal UE2-1 serving as the transmission source of the latest received first SRS.

In step S105, the radio base station eNB1-1 transmits a downlink radio signal to the serving radio terminal UE2-1 using the downlink resource block assigned to the serving radio terminal UE2-1 serving as the transmission source of the latest received first SRS.

Figure 20:
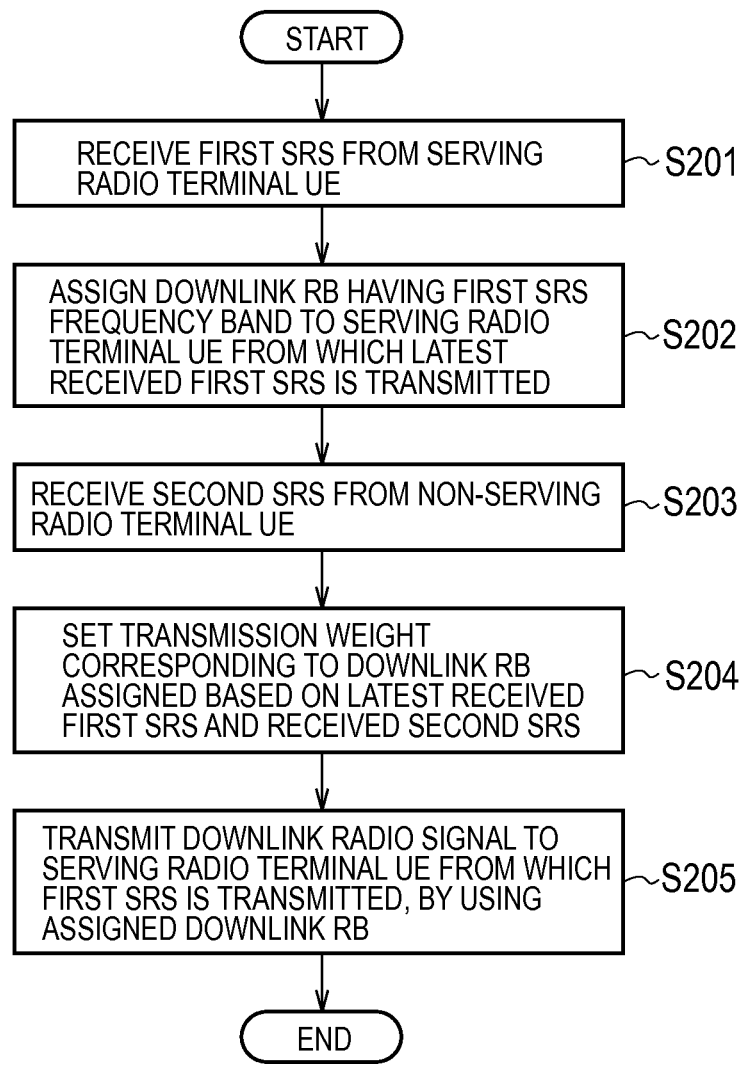
FIG. 20 is a flowchart illustrating a second operation of the radio base station according to the second embodiment of the present invention.

FIG. 20 is a flowchart illustrating a second operation of the radio base station eNB1-1. The flowchart illustrated in FIG. 20 corresponds to the case in which the aforementioned second process is performed.

In step S201, the radio base station eNB1-1 receives first SRS from the serving radio terminal UE2-1.

In step S202, the radio base station eNB1-1 assigns a downlink resource block having a frequency band used for the transmission of the first SRS to the serving radio terminal UE2-1 serving as a transmission source of the latest received first SRS.

In step S203, the radio base station eNB1-1 receives second SRS from the non-serving radio terminal UE2-2.

In step S204, based on the latest received first SRS and received second SRS, the radio base station eNB1-1 sets a transmission weight at the time of transmission of a downlink radio signal using the downlink resource block assigned to the serving radio terminal UE2-1 serving as the transmission source of the latest received first SRS.

In step S205, the radio base station eNB1-1 transmits a downlink radio signal to the serving radio terminal UE2-1 using the downlink resource block assigned to the serving radio terminal UE2-1 serving as the transmission source of the latest received first SRS.

(2.4) Operation and Effect

As described above, according to the second embodiment, the radio base station eNB1-1 receives first SRS transmitted by the serving radio terminal UE2-1. Moreover, the radio base station eNB1-1 assigns a downlink resource block, which has a frequency band used for the transmission of the latest received first SRS, to the serving radio terminal UE2-1, at a timing of a subframe of a downlink resource block at a time point after the timing of the latest received first SRS and near the timing of the latest received first SRS. As a consequence, the radio base station eNB1-1 refers to first SRS, which is considered to have a propagation environment similar to that of the downlink resource block assigned to the serving radio terminal UE2-1, in the calculation of an antenna weight corresponding to the downlink resource block assigned to the serving radio terminal UE2-1, thereby calculating an antenna weight at which a desired wave direction of a beam is directed to the serving radio terminal UE2-1 and accurately performing the calculation of the antenna weight.

Furthermore, when second SRS transmitted by the non-serving radio terminal UE2-2 was received, the radio base station eNB1-1 refers to the second SRS in the calculation of the antenna weight corresponding to the downlink resource block assigned to the serving radio terminal UE2-1, thereby calculating an antenna weight at which the desired wave direction of the beam is directed to the serving radio terminal UE2-1 and a null direction of the beam is directed to the non-serving radio terminal UE2-2, and more accurately performing the calculation of the antenna weight.

Furthermore, the radio base station eNB1-1 assigns a downlink resource block, which has a frequency band used for the transmission of the latest received first SRS, to the serving radio terminal UE2-1 at a timing of a subframe of a downlink resource block in a frame including the timing of the latest received first SRS. Accordingly, a time from the timing of the latest received first SRS to a timing of a downlink resource block to be assigned can be set as within a time of one frame. Consequently, a time from the timing of the first SRS to the timing of the downlink resource block assigned to the serving radio terminal UE2-1 is shortened, so that it is possible to guarantee that a propagation environment in the first SRS is approximate to a propagation environment of the downlink resource block assigned to the serving radio terminal UE2-1.

(2.5) Other Embodiments

Thus, the present invention has been described with the embodiment. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiments, the radio base station eNB1-1 set the time from the timing of the latest received first SRS to the timing of the downlink resource block to be assigned, as within the time of one frame. However, the radio base station eNB1-1 may set the time from the timing of the latest received first SRS to the timing of the downlink resource block to be assigned, as within a time of a switching cycle of a frequency band that is used for the transmission of the first SRS, or within a time of a transmission cycle of the first SRS. Also in this case, the time from the timing of the first SRS to the timing of the downlink resource block assigned to the serving radio terminal UE2-1 is shortened, so that it is possible to guarantee that a propagation environment in the first SRS is approximate to a propagation environment of the downlink resource block assigned to the serving radio terminal UE2-1.

Furthermore, in the aforementioned embodiments, the serving radio terminal UE2-1 transmitted the first SRS at the timing of the special subframe. However, the transmission timing of the first SRS is not limited thereto, and it is sufficient if the transmission timing of the first SRS is a timing agreed in advance between the radio base station eNB1-1 and the serving radio terminal UE2-1. However, it is preferable that the transmission timing of the first SRS exists once in a time of at least one frame.

Furthermore, in the aforementioned embodiments, the radio base station eNB1-1 used the reception weight as the transmission weight. However, the transmission weight may be calculated independently of the reception weight.

In the aforementioned embodiments, the TDD-LTE radio communication system was described. However, the present invention can be applied in the same manner to all types of radio communication systems in which asymmetric radio communication in which a frequency band of an uplink radio signal to be assigned to a radio terminal is different from a frequency band of a downlink radio signal is employed.

Thus, it must be understood that the present invention includes various embodiments that are not described herein. Therefore, the present invention is limited only by the specific features of the invention in the scope of the claims reasonably evident from the disclosure above.

[Third Embodiment]

Next, a third embodiment of the present invention will be described with reference to the drawings. Specifically, the second embodiment will be described in sequence of (3.1) Configuration of radio communication system, (3.2) Configuration of radio base station, (3.3) Operation of radio base station, (3.4) Operation and effect, and (3.5) Other embodiments. It is to be noted that the same or similar reference numerals are applied to the same or similar parts through the drawings in the following embodiments.

(3.1) Configuration of Radio Communication System

Figure 21:
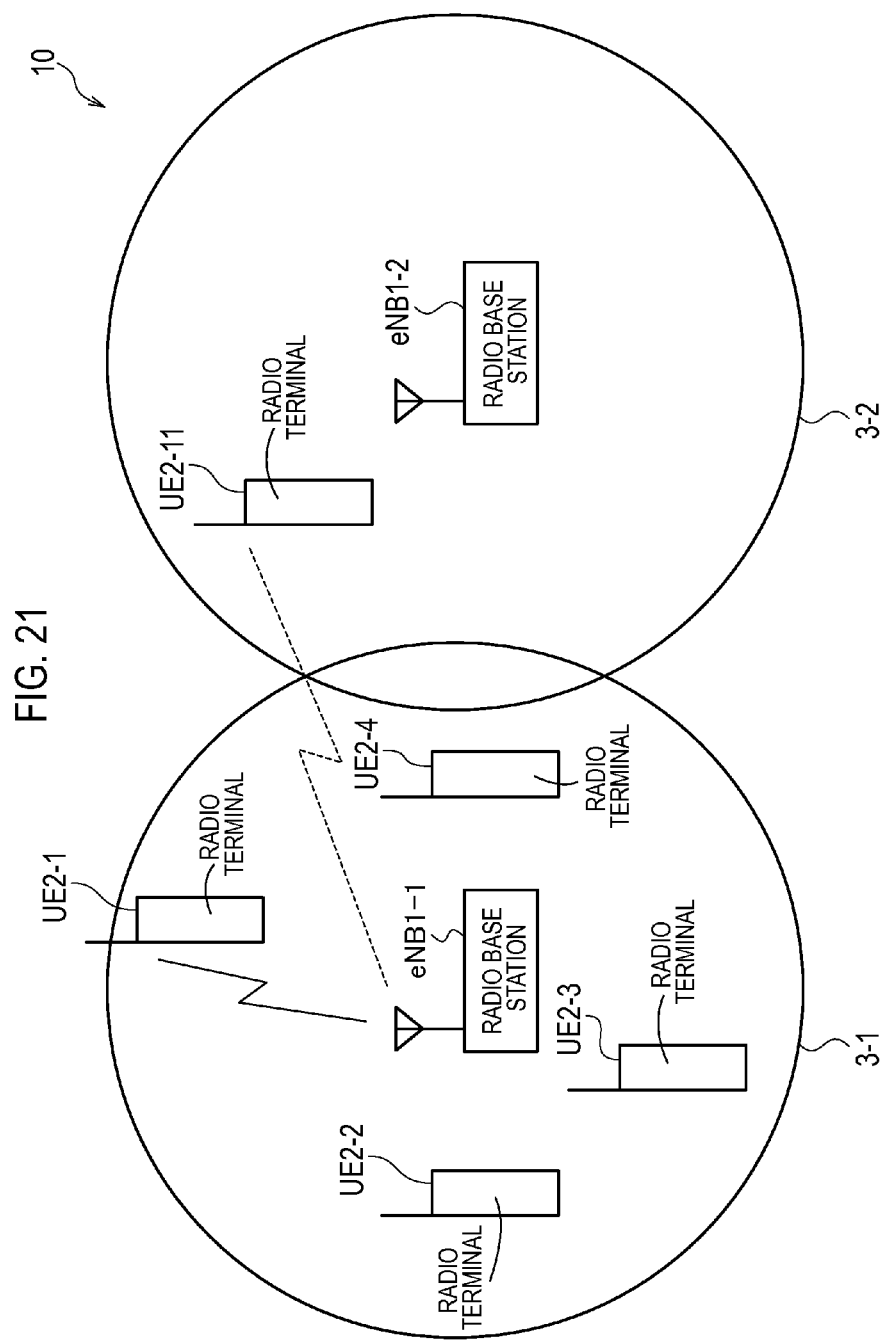
FIG. 21 is an entire schematic configuration diagram of a radio communication system according to a third embodiment of the present invention.

FIG. 21 is an entire schematic configuration diagram of the radio communication system 10 according to the third embodiment of the present invention.

The radio communication system 10 illustrated in FIG. 21 is a TDD-LTE radio communication system. The radio communication system 10 includes the radio base station eNB1-1, the radio base station eNB1-2, the radio terminal UE2-1, the radio terminal UE2-2, the radio terminal UE2-3, the radio terminal UE2-4, and a radio terminal UE2-11.

In FIG. 21, the radio base station eNB1-1 and the radio base station eNB1-2 constitute E-UTRAN (Evolved-UMTS Terrestrial Radio Access Network). The radio terminal UE2-1 to the radio terminal UE2-4 exist in a cell 3-1 that is a communication available area provided by the radio base station eNB1-1. The radio terminal UE2-11 exists in the cell 3-2 that is a communication available area provided by the radio base station eNB1-2.

The radio terminal UE2-1 to the radio terminal UE2-4 are terminals to which a resource block is assigned by the radio base station eNB1-1. Furthermore, the radio terminal UE2-11 is a terminal to which a resource block is assigned by the radio base station eNB1-2. In this case, when the radio base station eNB1-1 is set as a reference, the radio terminal UE2-1 to the radio terminal UE2-4 are serving radio terminals and the radio terminal UE2-11 is a non-serving radio terminal. Hereinafter, the radio terminal, to which the resource block is assigned by the radio base station eNB1-1, will be appropriately referred to as a serving radio terminal UE2.

Time division duplex is employed in radio communication between the radio base station eNB1-1 and the radio terminal UE2-1 to the radio terminal UE2-4 and radio communication between the radio base station eNB1-2 and the radio terminal UE2-11, OFDMA (Orthogonal Frequency Division Multiplexing Access) is employed in downlink radio communication, and SC-FDMA (Single Carrier Frequency Division Multiple Access) is employed in uplink radio communication. Furthermore, downlink indicates a direction from the radio base station eNB1-1 to the radio terminal UE2-1 to the radio terminal UE2-4. Uplink indicates a direction from the radio terminal UE2-1 to the radio terminal UE2-4 to the radio base station eNB1-1.

The radio base station eNB1-1 assigns a resource block (RB) as a radio resource to the serving radio terminal UE2 in the cell 3-1.

The resource block includes a downlink resource block (downlink RB) to be used in the downlink radio communication and an uplink resource block (uplink RB) to be used in the uplink radio communication. A plurality of downlink resource blocks are arranged in the frequency direction and the time direction. Similarly, a plurality of uplink resource blocks are arranged in the frequency direction and the time direction.

Figure 22:
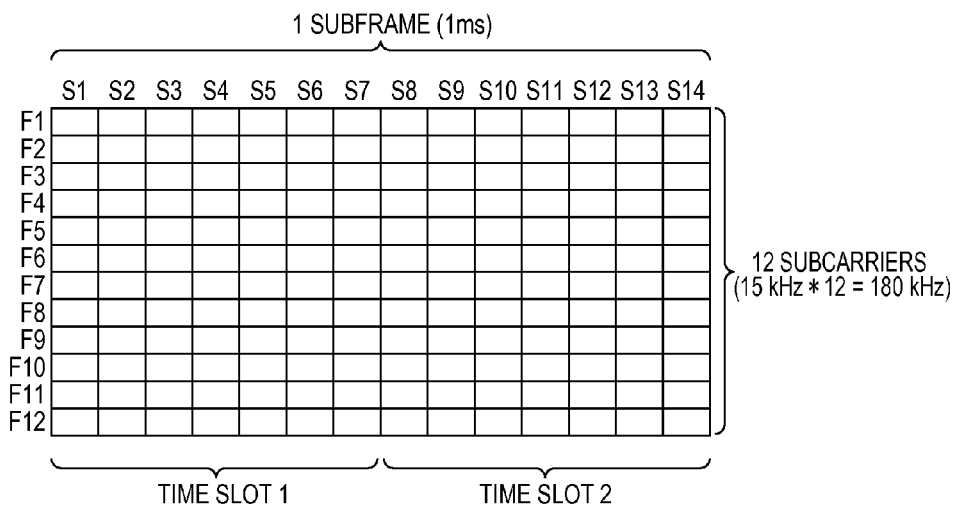
FIG. 22 is a diagram illustrating a format of a resource block according to the third embodiment of the present invention.

FIG. 22 is a diagram illustrating a format of the resource block. As illustrated in FIG. 22, the resource block is configured in one subframe having a time length of 1 [ms] in the time direction. The subframe includes a time zone S1 to a time zone S14. Among the time zone S1 to the time zone S14, the time zone S1 to the time zone S7 constitute a first half time slot (a time slot 1) and the time zone S8 to the time zone S14 constitute a latter half time slot (a time slot 2).

As illustrated in FIG. 22, the resource block has a frequency bandwidth of 180 [kHz] in the frequency direction. Furthermore, the resource block includes 12 subcarriers F1 to F12 having a frequency bandwidth of 15 [kHz].

Figure 23:
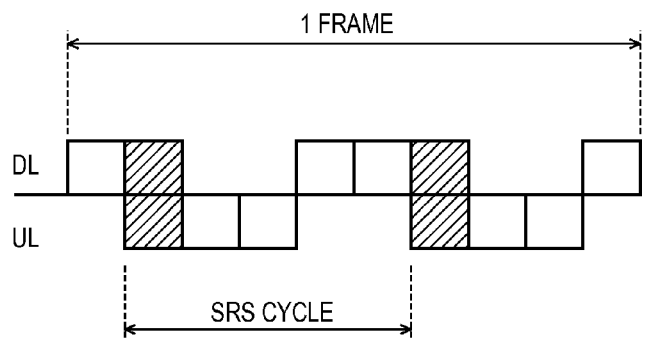
FIG. 23 is a diagram illustrating a format of a frame according to the third embodiment of the present invention.

Furthermore, in the time direction, a plurality of subframes constitute one frame. FIG. 23 is a diagram illustrating a format of the frame. The frame illustrated in FIG. 23 includes 10 subframes. The frame includes 10 subframes in the sequence of a subframe of a downlink resource block, subframes (special subframes: SSF) of both the downlink resource block and an uplink resource block, a subframe of the uplink resource block, a subframe of the uplink resource block, a subframe of the downlink resource block, a subframe of the downlink resource block, a special subframe, a subframe of the uplink resource block, a subframe of the uplink resource block, and a subframe of the downlink resource block.

Figure 24:
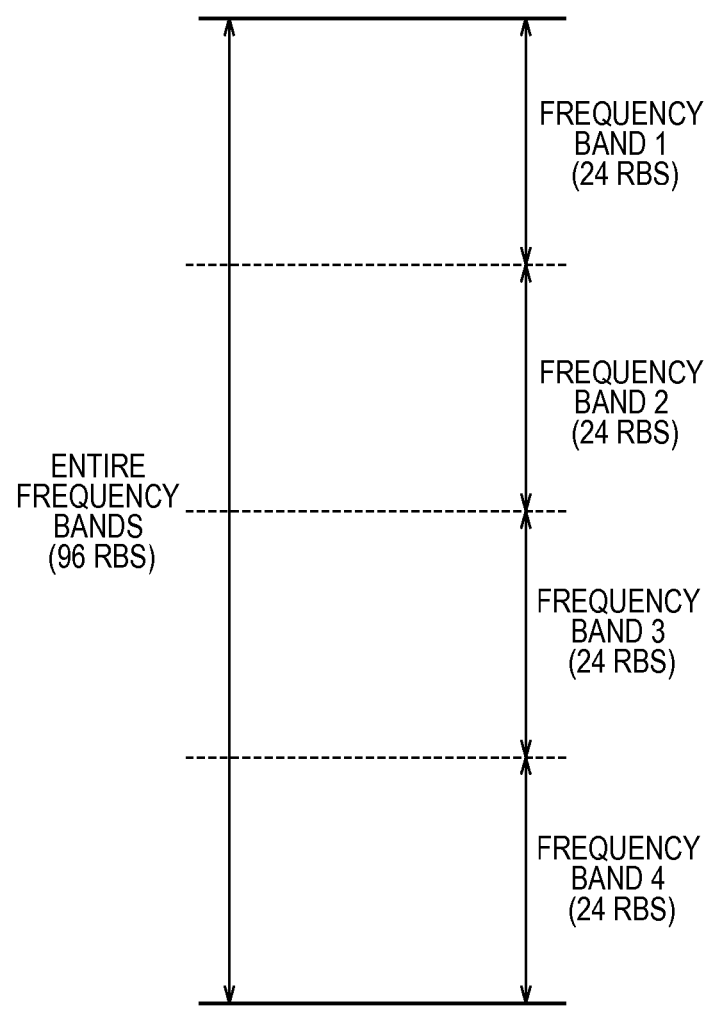
FIG. 24 is a diagram illustrating a configuration of an entire frequency band available in radio communication between a radio base station and a radio terminal according to the third embodiment of the present invention.

Furthermore, in the frequency direction, an entire frequency band available in the radio communication between the radio base station eNB1-1 and the serving radio terminal UE2 has bands corresponding to a plurality of resource blocks. Furthermore, the entire frequency band is divided into frequency bands corresponding to multiples of four of the number of the resource blocks. FIG. 24 is a diagram illustrating a configuration of the entire frequency band available in the radio communication between the radio base station eNB1-1 and the serving radio terminal UE2. As illustrated in FIG. 24, the entire frequency band available in the radio communication between the radio base station eNB1-1 and the serving radio terminal UE2 has bands corresponding to 96 resource blocks. Furthermore, the entire frequency band is divided into a frequency band 1 to a frequency band 4, each of which has bands corresponding to 24 resource blocks.

The downlink resource block includes a control information channel (PDCCH: Physical Downlink Control CHannel) for transmitting downlink control information, and a shared data channel (PDSCH: Physical Downlink Shared CHannel) for transmitting downlink user data in the time direction.

Meanwhile, the uplink resource block includes a control information channel (PUCCH: Physical Uplink Control CHannel) for transmitting uplink control information at both ends of an entire frequency band available in the uplink radio communication, and a shared data channel (PUSCH: Physical Uplink Shared CHannel) for transmitting uplink user data at the center part thereof.

(3.2) Configuration of Radio Base Station

Figure 25:
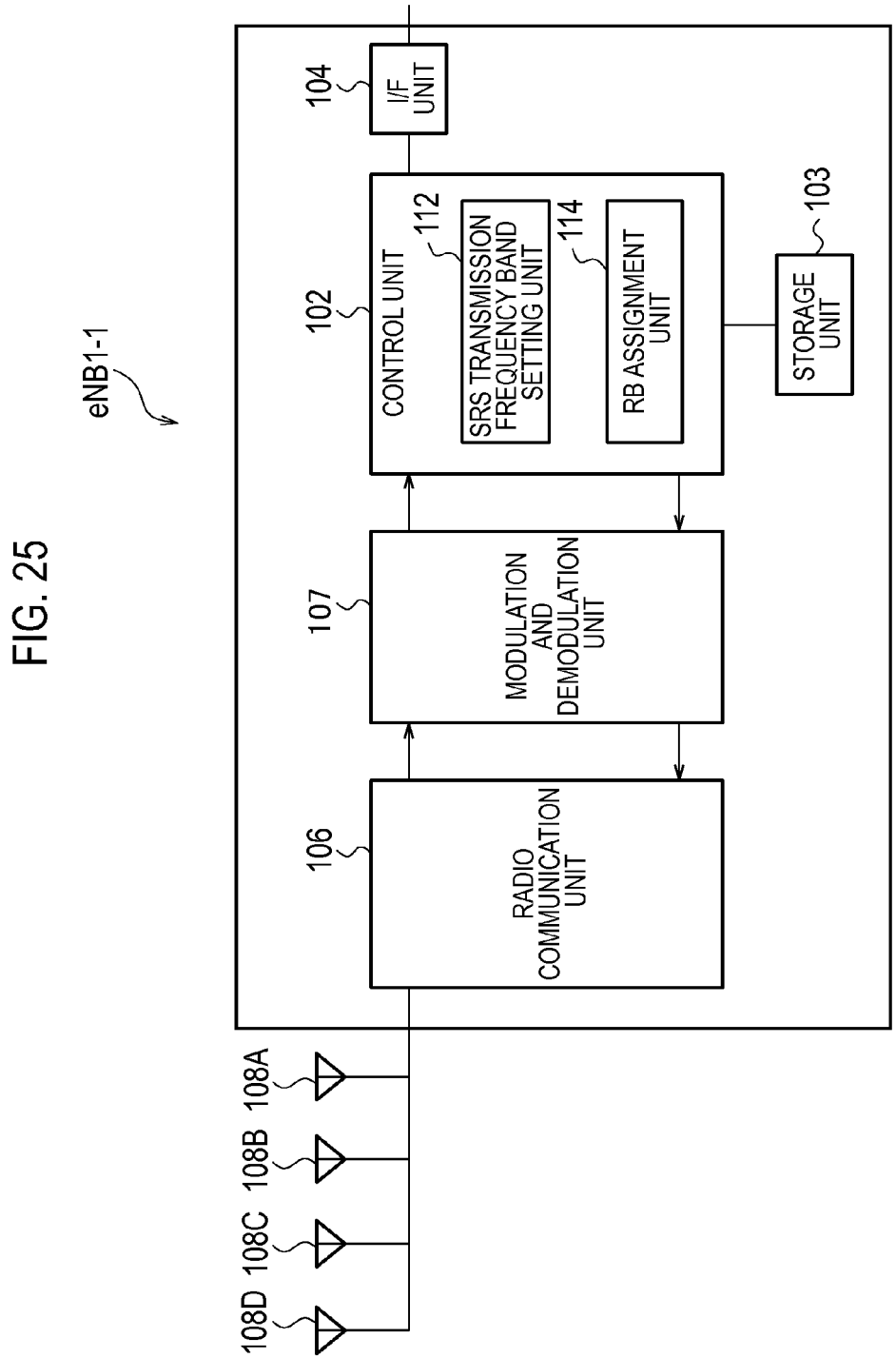
FIG. 25 is a configuration diagram of the radio base station according to the third embodiment of the present invention.

FIG. 25 is a configuration diagram of the radio base station eNB1-1. As illustrated in FIG. 25, the radio base station eNB1-1 is a radio base station of an adaptive array scheme for applying an antenna weight to a plurality of antennas, and includes the control unit 102, the storage unit 103, the I/F unit 104, the radio communication unit 106, the modulation and demodulation unit 107, the antenna 108A, the antenna 108B, the antenna 108C, and the antenna 108D.

The control unit 102, for example, is configured by a CPU, and controls various functions of the radio base station eNB1-1. The control unit 102 includes a sounding reference signal (SRS) transmission frequency band setting unit 112 and a resource block (RB) assignment unit 114. The storage unit 103, for example, is configured by a memory, and stores various types of information used for the control and the like of the radio base station eNB1-1.

The I/F unit 104 is able to communicate with another radio base station eNB through an X1 interface. Furthermore, the I/F unit 104 is able to communicate with EPC (Evolved Packet Core) (not shown), specifically, MME (Mobility Management Entity)/S-GW (Serving Gateway), through an S1 interface.

The radio communication unit 106 receives an uplink radio signal, which is transmitted from the serving radio terminal UE2-1, through the antenna 108A to the antenna 108D. Moreover, the radio communication unit 106 converts (down-converts) the received uplink radio signal to a baseband signal, and outputs the baseband signal to the modulation and demodulation unit 107.

The modulation and demodulation unit 107 performs demodulation and decoding processes for the input baseband signal. In this way, data included in the uplink radio signal transmitted from the radio terminal UE2-1 is obtained. The data is output to the control unit 102.

Furthermore, the modulation and demodulation unit 107 performs encoding and modulation of data from the control unit 102, thereby obtaining a baseband signal. The radio communication unit 106 converts (up-converts) the baseband signal to a downlink radio signal. Moreover, the modulation and demodulation unit 107 transmits the downlink radio signal through the antenna 108A to the antenna 108D.

The SRS transmission frequency band setting unit 112 of the control unit 102 sets, to each serving radio terminal UE2, different frequency bands (SRS transmission frequency bands) that are available when the serving radio terminal UE2 transmits a sounding reference signal (SRS) at a timing of a predetermined special subframe. Furthermore, the SRS is a signal to be referred to in the calculation of an antenna weight in the radio base station eNB1-1, and is an uplink radio signal of a radio frequency band.

The serving radio terminal UE2 uses a frequency hopping scheme, and transmits the SRS at each special subframe timing while switching the SRS transmission frequency band. In the third embodiment, a switching sequence is common in each serving radio terminal UE2. In the present embodiment, the SRS transmission frequency band is switched in the sequence of the frequency band 1, frequency band 3, frequency band 2, and frequency band 4 illustrated in FIG. 24, and then returns to the frequency band 1, which is called a periodical switching sequence. However, there is a difference in the SRS transmission frequency bands of each serving radio terminal UE2 at the same timing. Accordingly, the SRS transmission frequency bands at the timing of the predetermined special subframe are set to be different for each serving radio terminal UE2, so that the SRS transmission frequency bands in each special subframe after the predetermined special subframe are different for each serving radio terminal UE2.

Specifically, the SRS transmission frequency band setting unit 112 performs the following first process and second process.

(First Process)

Figure 26:
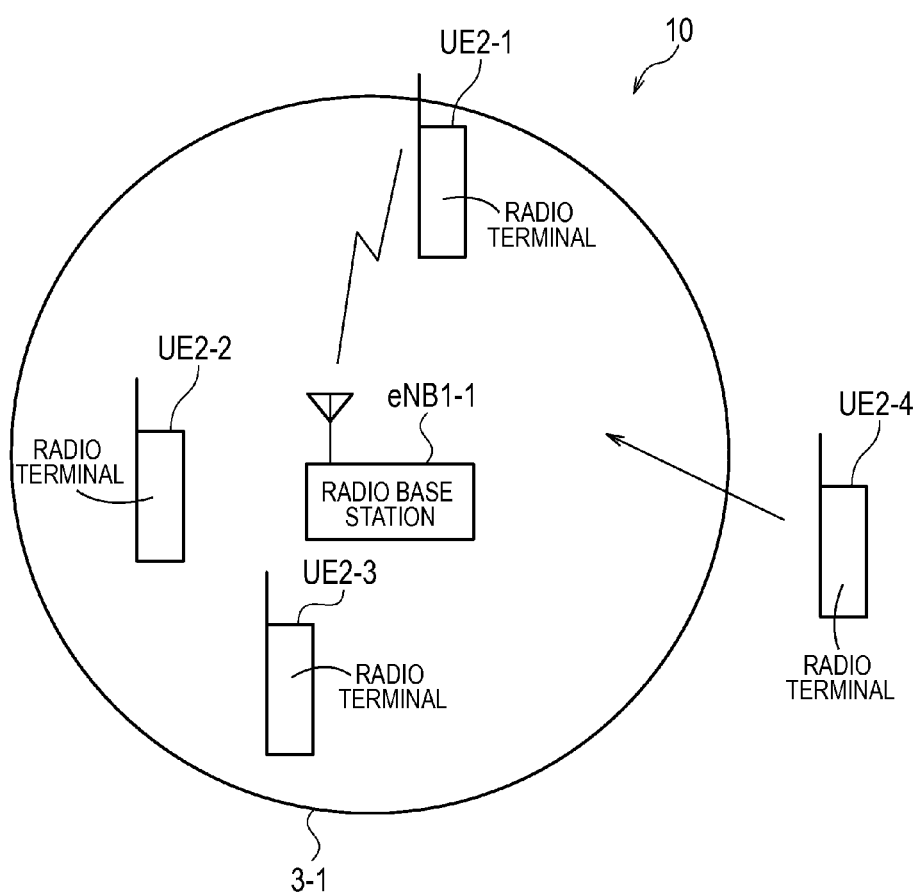
FIG. 26 is a diagram illustrating a first example of movement of the radio terminal according to the third embodiment of the present invention.

Considered is the case in which as illustrated in FIG. 26, serving radio terminals initially existing in the cell 3-1 are the serving radio terminal UE2-1 to the serving radio terminal UE2-3, and then the radio terminal UE2-4 newly enters the cell 3-1 and serves as a new serving radio terminal. In addition, the case, in which in the cell 3-1, the power of the radio terminal UE2-5 is turned from off to on and serves as the serving radio terminal and then in the cell 3-1, the power of the radio terminal UE2-4 is turned from on to off and serves as the non-serving radio terminal, is also the same.

Figure 27:
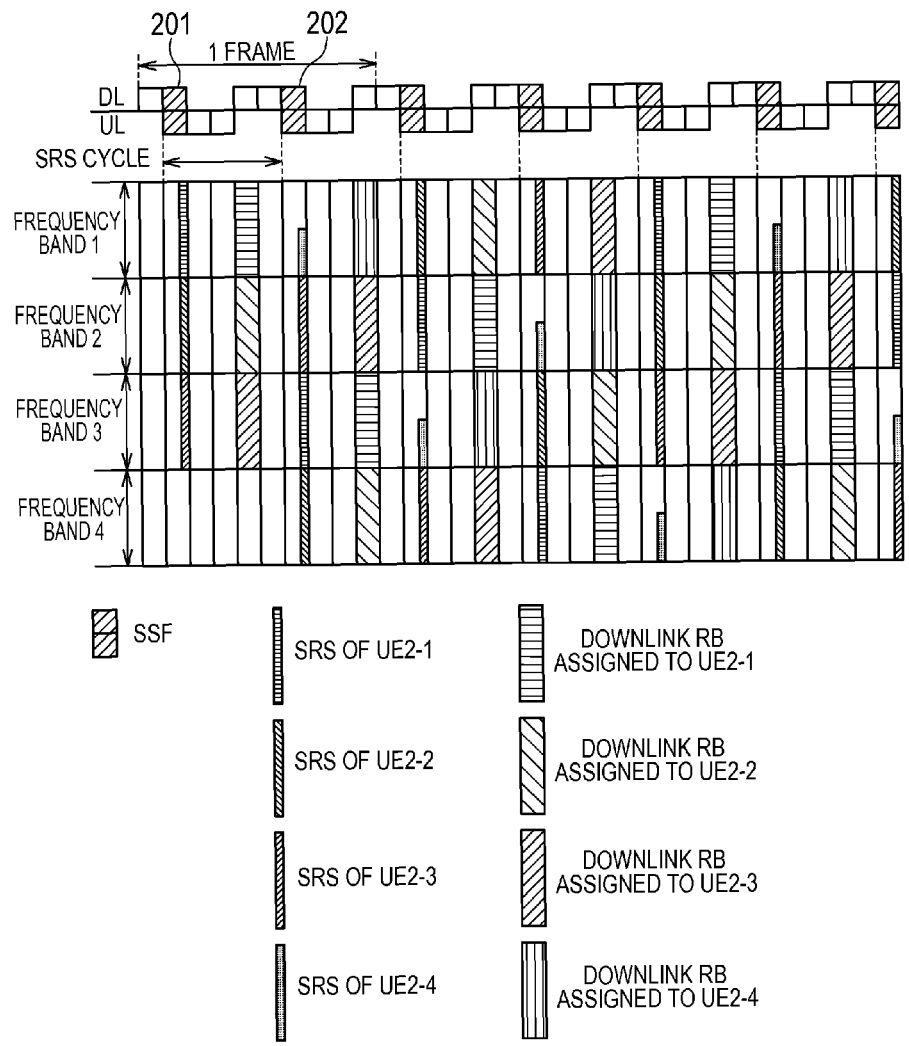
FIG. 27 is a diagram illustrating a first example of setting of a SRS transmission frequency band and the correspondence between the SRS transmission frequency band and assigned downlink RB, according to the third embodiment of the present invention.

When only the serving radio terminal UE2-1 to the serving radio terminal UE2-3 exist in the cell 3-1, the frequency band 1 is set as a transmission frequency band of SRS of the serving radio terminal UE2-1, the frequency band 2 is set as a transmission frequency band of SRS of the serving radio terminal UE2-2, and the frequency band 3 is set as a transmission frequency band of SRS of the serving radio terminal UE2-3 at a timing of the special subframe 201 in FIG. 27. Meanwhile, the frequency band 4 is an unset SRS transmission frequency band that is not set in any serving radio terminal.

Considered is the case in which then, between the timing of the special subframe 201 in FIG. 27 and a timing of the special subframe 202, the radio terminal UE2-4 newly enters the cell 3-1 and serves as the new serving radio terminal.

As described above, the switching sequence of the SRS transmission frequency band in the serving radio terminal UE2 is a sequence of the frequency band 1, the frequency band 3, the frequency band 2, and the frequency band 4. Accordingly, at the timing of the special subframe 202 in FIG. 27, the serving radio terminal UE2-1 transmits SRS using the frequency band 3, the serving radio terminal UE2-2 transmits SRS using the frequency band 4, and the serving radio terminal UE2-3 transmits SRS using the frequency band 2. That is, at the timing of the special subframe 202, the frequency band 1 is the unset SRS transmission frequency band.

In this case, the SRS transmission frequency band setting unit 112 sets the frequency band 1 (the unset SRS transmission frequency band) as a transmission frequency band of SRS of the new serving radio terminal UE2-4 at the timing of the special subframe 202 in FIG. 27. Moreover, the SRS transmission frequency band setting unit 112 transmits information on the frequency band 4 as information on the SRS transmission frequency band to the new serving radio terminal UE2-4 through the modulation and demodulation unit 107, the radio communication unit 106, and the antenna 108A to the antenna 108D. When the information on the frequency band 1 as the information on the SRS transmission frequency band is received, the new serving radio terminal UE2-4 transmits the SRS using the frequency band 1 at the timing of the special subframe 202 in FIG. 27.

(Second Process)

Figure 28:
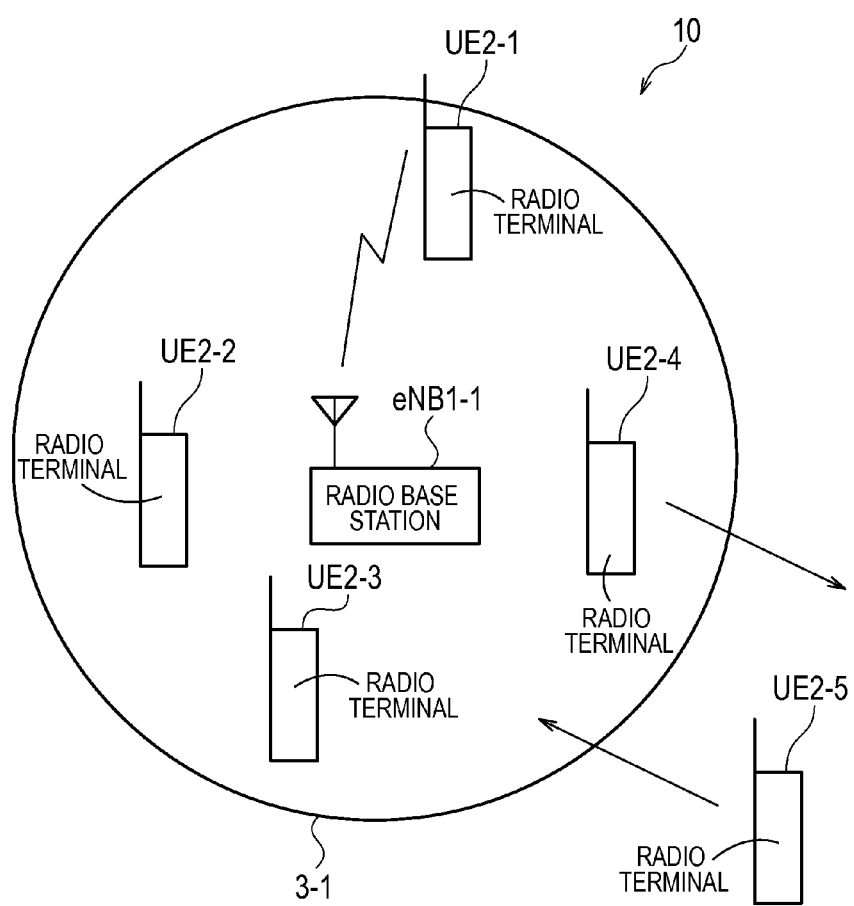
FIG. 28 is a diagram illustrating a second example of movement of the radio terminal according to the third embodiment of the present invention.

Considered is the case in which as illustrated in FIG. 28, serving radio terminals initially existing in the cell 3-1 are the serving radio terminal UE2-1 to the serving radio terminal UE2-4, the radio terminal UE2-5 newly enters the cell 3-1 and serves as a new serving radio terminal, and then the serving radio terminal UE2-4 moves out of the cell 3-1 and serves as a non-serving radio terminal, or the case in which in the cell 3-1, the power of the radio terminal UE2-4 is turned from on to off and serves as the non-serving radio terminal.

Figure 29:
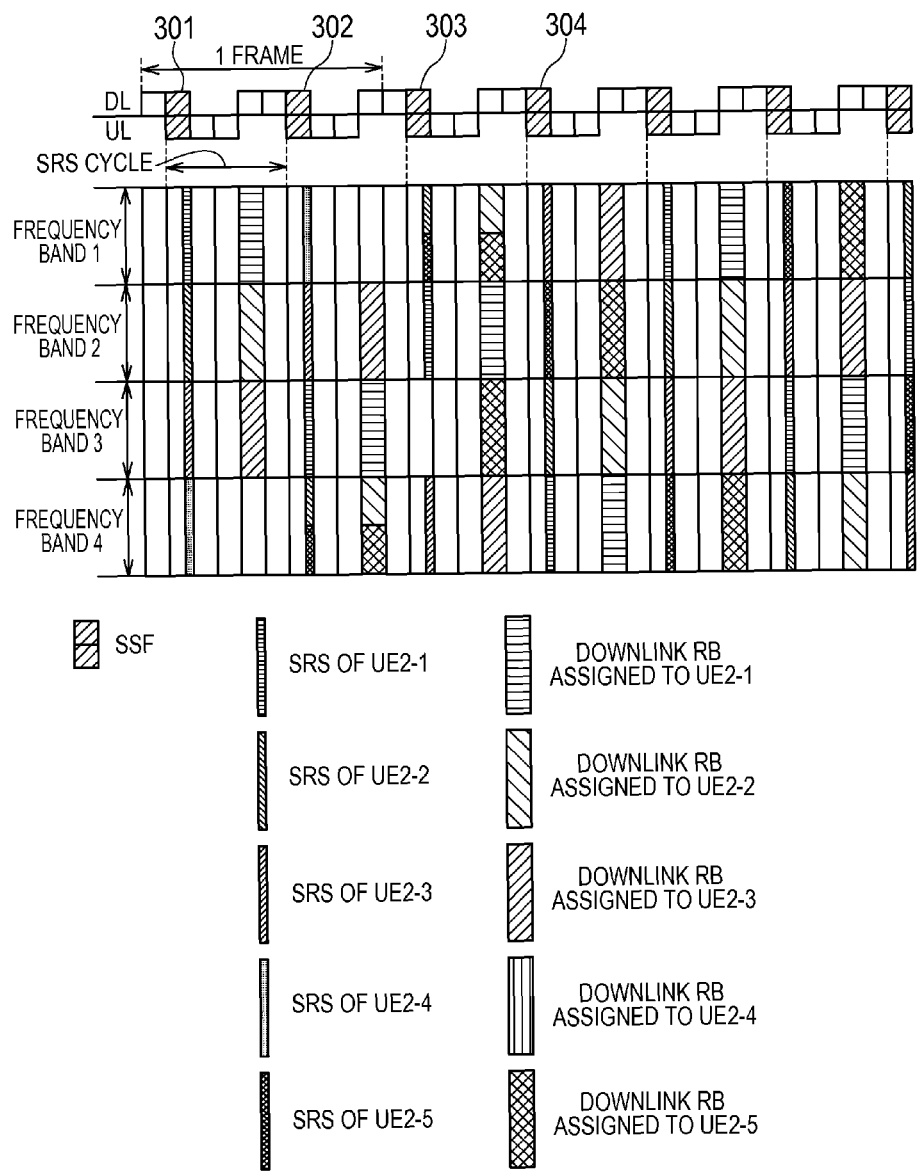
FIG. 29 is a diagram illustrating a second example of the setting of the SRS transmission frequency band and the correspondence between the SRS transmission frequency band and the assigned downlink RB according to the third embodiment of the present invention.

When only the serving radio terminal UE2-1 to the serving radio terminal UE2-4 exist in the cell 3-1, the frequency band 1 is set as a transmission frequency band of SRS of the serving radio terminal UE2-1, the frequency band 2 is set as a transmission frequency band of SRS of the serving radio terminal UE2-2, the frequency band 3 is set as a transmission frequency band of SRS of the serving radio terminal UE2-3, and the frequency band 4 is set as a transmission frequency band of SRS of the serving radio terminal UE2-4 at a timing of the special subframe 301 in FIG. 29.

Considered is the case in which then, between the timing of the special subframe 301 in FIG. 29 and a timing of a special subframe 302, the radio terminal UE2-5 newly enters the cell 3-1 and serves as the new serving radio terminal.

In this case, at the timing of the special subframe 302 in FIG. 29, the serving radio terminal UE2-1 transmits SRS using the frequency band 3, the serving radio terminal UE2-2 transmits SRS using the frequency band 4, the serving radio terminal UE2-3 transmits SRS using the frequency band 2, and the serving radio terminal UE2-4 transmits SRS using the frequency band 1. That is, at the timing of the special subframe 302, there is no unset SRS transmission frequency band.

In this case, the SRS transmission frequency band setting unit 112 designates priority (setting priority) of setting of the SRS transmission frequency band, which is determined according to a communication state of the serving radio terminal UE2, with respect to the serving radio terminal UE2-1 to the serving radio terminal UE2-5.

The setting priority is determined in advance based on various types of information. As a first example, the type of a communication service used by the serving radio terminal UE2 is considered. In this case, when the communication service is a VoIP service requiring real-time, the setting priority is low. As a second example, a price plan of a communication service in the serving radio terminal UE2 is considered. In this case, the setting priority is higher in a price plan requiring more good communication quality. Furthermore, as a third example, the amount of transmission data held by the serving radio terminal UE2 is considered. In this case, the setting priority is higher as the amount of transmission data held by the serving radio terminal UE2 is larger. The SRS transmission frequency band setting unit 112 is able to acquire information required for determining the setting priority from the serving radio terminal UE2 or EPC. Hereinafter, it is assumed that the setting priority has two levels of high and low.

Next, the SRS transmission frequency band setting unit 112 sets a bandwidth of a SRS transmission frequency band with respect to each serving radio terminal UE2 such that the bandwidth of the SRS transmission frequency band is larger as the setting priority is higher.

Considered is the case in which the setting priorities of the serving radio terminal UE2-1, the serving radio terminal UE2-3, and the serving radio terminal UE2-4 are high and the setting priorities of the serving radio terminal UE2-2 and the serving radio terminal UE2-5 are low. In this case, the SRS transmission frequency band setting unit 112 divides the frequency band 4, which is a single SRS transmission frequency band of the serving radio terminal UE2-2 at the timing of the special subframe 302 in FIG. 29, into two frequency bands. Moreover, the SRS transmission frequency band setting unit 112 sets a divided SRS transmission frequency band, which is one of the two frequency bands, to the serving radio terminal UE2-2, and sets a divided SRS transmission frequency band, which is the other one of the two frequency bands, to the serving radio terminal UE2-5.

Moreover, the SRS transmission frequency band setting unit 112 transmits information on the divided SRS transmission frequency band as information on the SRS transmission frequency band to the serving radio terminal UE2-2 through the modulation and demodulation unit 107, the radio communication unit 106, and the antenna 108A to the antenna 108D. Furthermore, the SRS transmission frequency band setting unit 112 transmits the information on the divided SRS transmission frequency band as information on the SRS transmission frequency band to the serving radio terminal UE2-5.

When the information on the divided SRS transmission frequency band is received, the serving radio terminal UE2-2 transmits SRS using a frequency of the divided SRS transmission frequency band at the timing of the special subframe 302 in FIG. 29. Furthermore, when the information on the divided SRS transmission frequency band is received, the serving radio terminal UE2-5 transmits SRS using a frequency of the divided SRS transmission frequency band at the timing of the special subframe 302 in FIG. 29.

Furthermore, the serving radio terminals UE2-1, the serving radio terminals UE2-2, and the serving radio terminals UE2-4 transmit SRS using a frequency of the single SRS transmission frequency band at the timing of the special subframe 302 in FIG. 29, similarly to the above.

Moreover, considered is the case in which then, between the timing of the special subframe 302 in FIG. 29 and a timing of the special subframe 303, the serving radio terminal UE2-4 moves out of the cell 3-1 and serves as a non-serving radio terminal.

In this case, the SRS transmission frequency band setting unit 112 detects that no SRS is transmitted using the frequency band 3 from the radio terminal UE2-4 serving as the non-serving radio terminal, at the timing of the special subframe 303, and recognizes that the frequency band 3 is the unset SRS transmission frequency band.

Moreover, the SRS transmission frequency band setting unit 112 sets the whole of the frequency band 3 at the timing of the special subframe 304 to the serving radio terminal UE2-2, to which the divided SRS transmission frequency band is set, as the SRS transmission frequency band at the timing of the special subframe 304 in FIG. 29. Furthermore, the SRS transmission frequency band setting unit 112 sets the whole of the frequency band 2, which is the unset SRS transmission frequency band at the timing of the special subframe 304, to the serving radio terminal UE2-5, to which the divided SRS transmission frequency band is set, as the SRS transmission frequency band at the timing of the special subframe 304 in FIG. 29.

Moreover, the SRS transmission frequency band setting unit 112 transmits the information on the frequency band 3 as the information on the SRS transmission frequency band to the serving radio terminal UE2-2 through the modulation and demodulation unit 107, the radio communication unit 106, and the adaptive antenna 108A to the antenna 108D. Furthermore, the SRS transmission frequency band setting unit 112 transmits the information on the frequency band 2 as the information on the SRS transmission frequency band to the serving radio terminal UE2-5.

When the information on the frequency band 3 as the information on the SRS transmission frequency band is received, the serving radio terminal UE2-2 transmits SRS using a frequency of the frequency band 3 at the timing of the special subframe 304 in FIG. 29. When the information on the frequency band 2 as the information on the SRS transmission frequency band is received, the serving radio terminal UE2-5 transmits SRS using a frequency of the frequency band 2 at the timing of the special subframe 304 in FIG. 29.

In the aforementioned first process and second process, when the SRS transmission frequency band setting unit 112 sets the SRS transmission frequency band with respect to each serving radio terminal UE2, the RB assignment unit 114 assigns a downlink resource block to each serving radio terminal UE2. Specifically, the RB assignment unit 114 performs the following process for each serving radio terminal UE2 (target serving radio terminal UE2) which is to be assigned.

That is, the RB assignment unit 114 employs a PF (Proportional Fair) scheme, and determines a frequency band (an assignment candidate frequency band) of a downlink resource block assignable to the target serving radio terminal UE2.

Next, the RB assignment unit 114 determines a timing at which a downlink resource is to be assigned to the target serving radio terminal UE2. Specifically, the RB assignment unit 114 determines a timing of at least one of subframes of downlink resource blocks between a timing of the latest SRS received from the target serving radio terminal UE2 and the end part of a frame including the timing of the SRS (refer to FIG. 27 and FIG. 29).

Next, the RB assignment unit 114 recognizes a frequency band, which was used for the transmission of the received latest SRS, based on the information on the SRS transmission frequency band. Next, the RB assignment unit 114 determines whether the frequency band used for the transmission of the received latest SRS overlaps the assignment candidate frequency band. When the frequency band used for the transmission of the received latest SRS overlaps the assignment candidate frequency band, the RB assignment unit 114 generates an RB assignment value (a downlink RB assignment value) in order to assign a downlink resource block, which corresponds to the determined timing of the subframe and has a frequency band of an overlapping part between the frequency band used for the transmission of the received latest SRS and the assignment candidate frequency band, to the target serving radio terminal UE2 serving as a transmission source of the latest SRS. The downlink RB assignment value is obtained by a process of a medium access control (MAC) layer. Furthermore, the downlink RB assignment value includes a resource block number indicating information for uniquely identifying a time zone and a frequency band of the downlink resource block to be assigned to the target serving radio terminal UE2.

The RB assignment unit 114 outputs the downlink RB assignment value to the modulation and demodulation unit 107. Furthermore, the RB assignment unit 114 transmits the resource block number of the downlink resource block, which is to be assigned to the target serving radio terminal UE2, to the target serving radio terminal UE2 through the modulation and demodulation unit 107, the radio communication unit 106, and the antenna 108A to the antenna 108D.

Then, the control unit 102 calculates an antenna weight (a reception weight), at which a signal-to-interference noise ratio (SINR) at the time of reception of the SRS from the serving radio terminal UE2-1 is maximum, with respect to the antenna 108A to the antenna 108D.

Next, the control unit 102 designates a time zone and a frequency band of a downlink resource block, which is to be assigned to the serving radio terminal UE2-1, based on the downlink RB assignment value generated by the RB assignment unit 114. PDSCH in the designated downlink resource block is PDSCH to which a transmission weight is to be set.

Next, the control unit 102 uses reception weights, which correspond to the antenna 108A to the antenna 108D, as transmission weights of the antenna 108A to the antenna 108D, which correspond to frequency bands of downlink resource blocks to which transmission weights are to be set.

(3.3) Operation of Radio Base Station

Figure 30:
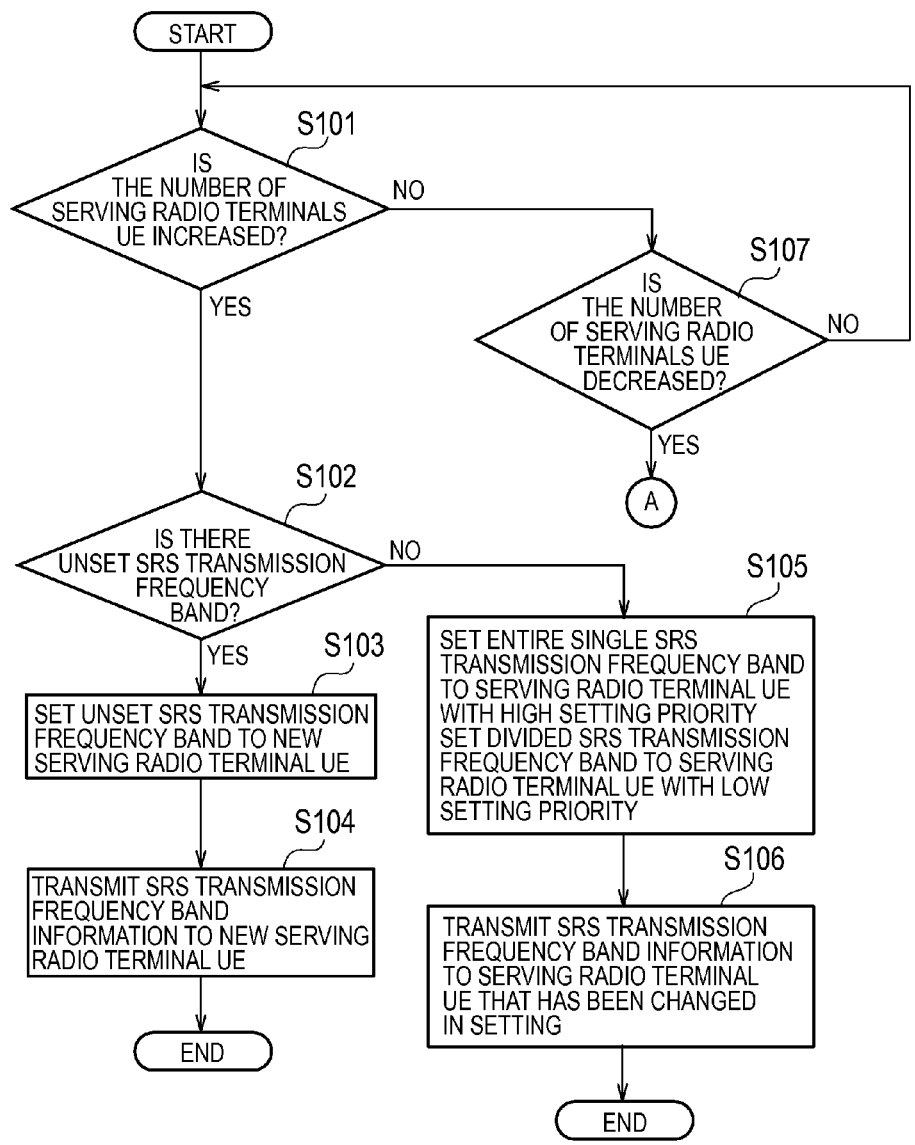
FIG. 30 is a flowchart illustrating a first operation of the radio base station according to the third embodiment of the present invention.

FIG. 30 and FIG. 31 are flowcharts illustrating an operation of the radio base station eNB1-1.

In step S101, the SRS transmission frequency band setting unit 112 of the radio base station eNB1-1 determines whether the number of the serving radio terminals UE2 is increased. Furthermore, when the number of the serving radio terminals UE2 is decreased, it represents the case in which the radio terminals UE2 enter the cell 3-1 and serve as new serving radio terminals UE2, or the radio terminals UE2 are powered on from off in the cell 3-1 and serve as new serving radio terminals UE2.

When the number of the serving radio terminals UE2 is increased, the SRS transmission frequency band setting unit 112 determines whether there is an unset SRS transmission frequency band in step S102.

When there is the unset SRS transmission frequency band, the SRS transmission frequency band setting unit 112 sets the unset SRS transmission frequency band to the new serving radio terminals UE2 in step S103.

In step S104, the SRS transmission frequency band setting unit 112 transmits information on the set SRS transmission frequency band to the new serving radio terminals UE2.

Meanwhile, when it is determined that there is no unset SRS transmission frequency band in step S102, the SRS transmission frequency band setting unit 112 sets the whole of the single SRS transmission frequency band to serving radio terminals UE2 with high setting priority, and sets the divided SRS transmission frequency band to serving radio terminals UE2 with low setting priority, in step S105.

In step S106, the SRS transmission frequency band setting unit 112 transmits information on the set SRS transmission frequency band to the serving radio terminals UE2 for which the setting of the SRS transmission frequency band was changed in step S105.

Furthermore, when it is determined that the number of the serving radio terminals UE2 is not increased in step S101, the SRS transmission frequency band setting unit 112 determines whether the number of the serving radio terminals UE2 is decreased in step S107. Furthermore, when the number of serving radio terminals UE2 is increased, it represents the case in which the radio terminals UE2 move out of the cell 3-1 and serve as non-serving radio terminals UE2, or the radio terminals UE2 are powered off from on in the cell 3-1 and serve as non-serving radio terminals UE2. In the case of negative determination in step S107, the operations after step S101 are repeated.

Meanwhile, when the number of serving radio terminals UE2 is decreased, operations illustrated in FIG. 31 are performed. In step S201, the SRS transmission frequency band setting unit 112 determines whether there are serving radio terminals UE2 to which the divided SRS transmission frequency band is set. In the case of negative determination in step S201, a series of operations are ended.

Meanwhile, when there are the serving radio terminals UE2 to which the divided SRS transmission frequency band is set, in step S202, the SRS transmission frequency band setting unit 112 sets the whole of the single SRS transmission frequency band to the serving radio terminals UE2 to which the divided SRS transmission frequency band is set. In addition, when it is not possible to set the whole of the single SRS transmission frequency band to the whole of the divided SRS transmission frequency band, the SRS transmission frequency band setting unit 112 sets the whole of the single SRS transmission frequency band to a serving radio terminal UE2 selected from the serving radio terminals UE2 to which the divided SRS transmission frequency band is set.

In step S203, the SRS transmission frequency band setting unit 112 transmits information on the set SRS transmission frequency band to the serving radio terminals UE2 for which the setting of the SRS transmission frequency band was changed in step S203.

(3.4) Operation and Effect

As described above, according to the third embodiment, the radio base station eNB1-1 sets to each serving radio terminal UE2 different frequency bands (SRS transmission frequency bands) that are used when the serving radio terminal UE2 transmits SRS at a timing of a predetermined special subframe.

At that time, the radio base station eNB1-1 sets the SRS transmission frequency band such that a bandwidth of a frequency band (an SRS transmission frequency band) available for the transmission of SRS in the serving radio terminal UE2 is larger as priority (setting priority) of setting of the SRS transmission frequency band, which is determined according to a communication state of the serving radio terminal UE2, is higher, and transmits information on the set SRS transmission frequency band to a radio terminal. Accordingly, as setting priority corresponding to the serving radio terminal UE2 is higher, the serving radio terminal UE2 increases an option of a frequency available for the transmission of the SRS, thereby easily avoiding interference from another radio base station eNB1-2 at the time of the transmission of the SRS, in other words, easily reducing the interference.

Furthermore, the serving radio terminal UE2 uses a frequency hopping scheme, and transmits the SRS at each special subframe timing while switching the SRS transmission frequency band. Furthermore, a common switching sequence is applied to each serving radio terminal UE2. Accordingly, different SRS transmission frequency bands at the timing of the predetermined special subframe are set to each serving radio terminal UE2, so that SRS transmission frequency bands at each special subframe are different for each serving radio terminal UE2.

Accordingly, each serving radio terminal UE2 is able to transmit SRS using different frequency bands at the timing of each special subframe. Thus, when the radio base station eNB1-1 assigns a downlink resource block, which has a frequency band equal to a frequency band used for the transmission of the latest received SRS, to the serving radio terminal UE2 serving as a transmission source of the latest received SRS, it is possible to suppress the probability that a frequency band that is used in the transmission of the SRS is concentrated on a specific frequency band and a serving radio terminal UE2, to which the downlink resource block is not assigned, is generated.

(3.5) Other Embodiments

Thus, the present invention has been described with the embodiment. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiments, when there is no unset SRS transmission frequency band, the radio base station eNB1-1 set the divided SRS transmission frequency band to the serving radio terminal UE2 with low setting priority. However, regardless of the presence or absence of the unset SRS transmission frequency band, the radio base station eNB1-1 may set the divided SRS transmission frequency band to the serving radio terminal UE2 with low setting priority.

In the aforementioned embodiments, the setting priority had two levels of high and low. However, the setting priority may have three levels or more. Furthermore, in the aforementioned embodiments, the single SRS transmission frequency band was divided into two frequency bands. However, the single SRS transmission frequency band may be divided into three frequency bands or more.

In the aforementioned embodiments, the timing of the special subframe was used as the transmission timing of SRS in the serving radio terminal UE2-1. However, the transmission timing of the SRS is not limited thereto, and it is sufficient if the transmission timing is a timing agreed in advance between the radio base station eNB1-1 and the serving radio terminal UE2. However, it is preferable that the transmission timing of the SRS exists once in a time of at least one frame.

Furthermore, in the aforementioned embodiments, the radio base station eNB1-1 used the reception weight as the transmission weight. However, the transmission weight may be calculated independently of the reception weight.

In the aforementioned embodiments, the TDD-LTE radio communication system was described. However, the present invention can be applied in the same manner to all types of radio communication systems in which asymmetric radio communication in which a frequency band of an uplink radio signal to be assigned to a radio terminal is different from a frequency band of a downlink radio signal is employed.

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-162331 (filed on Jul. 16, 2010), Japanese Patent Application No. 2010-162332 (filed on Jul. 16, 2010), and Japanese Patent Application No. 2010-162333 (filed on Jul. 16, 2010) are incorporated in the present specification by reference.

INDUSTRIAL APPLICABILITY

Firstly, according to the present invention, it is possible to improve a use efficiency of a downlink radio resource. Secondly, according to the present invention, it is possible to accurately perform the calculation of an antenna weight for a downlink radio resource. Thirdly, according to the present invention, it is possible to reduce interference at the time of transmission of a reference signal by a radio terminal.

The invention claimed is:

1. A radio base station of an adaptive array scheme for applying an antenna weight to a plurality of antennas, comprising:

a control unit that sets, to each serving radio terminal, different reference signal transmission frequency bands that are used for transmission of a reference signal to be referred to in calculation of the antenna weight; and a transmission unit that transmits information on the reference signal transmission frequency bands set by the control unit to the serving radio terminal, wherein the serving radio terminal switches the reference signal transmission frequency band for each predetermined switching time period.

2. The radio base station according to claim 1, wherein the reference signal is simultaneously transmitted from a plurality of serving radio terminals while switching a frequency band for each predetermined switching time period by a predetermined rule, and the control unit sets different reference signal transmission frequency bands to each serving radio terminal at a predetermined timing.

3. The radio base station according to claim 1, wherein the control unit sets an unset reference signal transmission frequency band of the reference signal transmission frequency bands to a new serving radio terminal, when the new serving radio terminal is turned up where the reference signal transmission frequency band is not set.

4. A radio base station of an adaptive array scheme for applying an antenna weight to a plurality of antennas comprising:

a control unit that sets, to each serving radio terminal, different reference signal transmission frequency bands that are used for transmission of a reference signal to be referred to in calculation of the antenna weight; and a transmission unit that transmits information on the reference signal transmission frequency bands set by the control unit to the serving radio terminal, wherein the control unit sets a same reference signal transmission frequency band to a plurality of serving radio terminals, when there is no unset reference signal transmission frequency band.

5. The radio base station according to claim 4, wherein the control unit sets the unset reference signal transmission frequency band to one of the plurality of serving radio terminals, when the unset reference signal transmission frequency band is turned up in a case where the same reference signal transmission frequency band has been set to the plurality of serving radio terminals.

6. The radio base station according to claim 4, wherein the control unit sets a reference signal transmission frequency band, which is equal to a reference signal transmission frequency band of another serving radio terminal, to a serving radio terminal with lower priority, when priority for setting of a reference signal transmission frequency band has been determined for the serving radio terminal.

7. A communication control method in a radio base station of an adaptive array scheme for applying an antenna weight to a plurality of antennas, comprising the steps of:

setting, to each serving radio terminal, different reference signal transmission frequency bands that are used for transmission of a reference signal to be referred to in calculation of the antenna weight; and transmitting information on the set reference signal transmission frequency bands to the serving radio terminal, wherein the serving radio terminal switches the reference signal transmission frequency band for each predetermined switching time period.

8. A radio base station of an adaptive array scheme for applying an antenna weight to a plurality of antennas, comprising:

a reception unit that receives a reference signal to be referred to in calculation of the antenna weight from a serving radio terminal; and an assignment unit that preferentially assigns a radio resource to the serving radio terminal, the radio resource having a frequency band used for transmission of a reference signal received at a time point near a target subframe and before the target subframe, wherein the reference signal is transmitted by the serving radio terminal while switching a frequency band.

9. The radio base station according to claim 8, further comprising:

a setting unit that sets the antenna weight such that a desired wave direction of a beam having a frequency band used for transmission of a reference signal from the serving radio terminal is directed to the serving radio terminal.

10. The radio base station according to claim 8, wherein the target subframe includes a plurality of subframes.

11. The radio base station according to claim 8, wherein, the reference signal is transmitted from the serving radio terminal while switching a frequency band for each predetermined switching time period, and the assignment unit preferentially assigns a radio resource to the serving radio terminal, the radio resource having a frequency band used for transmission of a reference signal received in the predetermined switching time period from the target subframe and before the target subframe.

12. The radio base station according to claim 8, wherein, the reference signal is transmitted by the serving radio terminal at least once in a communication frame time period, and the assignment unit preferentially assigns a radio resource having a frequency band used for transmission of a reference signal received in the communication frame time period from the target subframe and before the target subframe.

13. A radio base station of an adaptive array scheme for applying an antenna weight to a plurality of antennas, comprising:

a reception unit that receives a reference signal to be referred to in calculation of the antenna weight from a non-serving radio terminal; and a setting unit that sets the antenna weight such that a null direction of a beam is directed to the non-serving radio terminal, the beam having a frequency band used for transmission of a reference signal received at a time point near a target subframe and before the target subframe, wherein the reference signal is transmitted by the non-serving radio terminal while switching a frequency band.

14. A communication control method in a radio base station of an adaptive array scheme for applying an antenna weight to a plurality of antennas, comprising the steps of:

receiving a reference signal to be referred to in calculation of the antenna weight from a serving radio terminal; and preferentially assigning a radio resource to the serving radio terminal, the radio resource having a frequency band used for transmission of a reference signal received at a time point near a target subframe and before the target subframe, wherein the reference signal is transmitted by the serving radio terminal while switching a frequency band.

15. A communication control method in a radio base station of an adaptive array scheme for applying an antenna weight to a plurality of antennas, comprising the steps of:
receiving a reference signal to be referred to in calculation of the antenna weight from a non-serving radio terminal; and
calculating the antenna weight such that a null direction of a beam is directed to the non-serving radio terminal, the beam having a frequency band used for transmission of a reference signal received at a time point near a target subframe and before the target subframe, wherein
the reference signal is transmitted by the non-serving radio terminal while switching a frequency band.

16. A radio base station of an adaptive array scheme for applying an antenna weight to a plurality of antennas, comprising:
a reception unit that receives a reference signal to be referred to in calculation of the antenna weight from a serving radio terminal;
a control unit that sets a bandwidth of a reference signal transmission frequency band available for transmission of a reference signal by the serving radio terminal, according to priority determined on the basis of a communication state in the serving radio terminal; and
a transmission unit that transmits information on the reference signal transmission frequency bands set by the control unit to the serving radio terminal.

17. The radio base station according to claim 16, wherein the control unit increases the bandwidth of the reference signal transmission frequency band as priority of the serving radio terminal is higher.

18. The radio base station according to claim 16, wherein the control unit sets different reference signal transmission frequency bands to each serving radio terminal.

19. The radio base station according to claim 16, wherein the reference signal is simultaneously transmitted from a plurality of serving radio terminals while switching a frequency band for each predetermined switching time period by a predetermined rule, and
the control unit sets different reference signal transmission frequency bands to each serving radio terminal at a predetermined timing.

20. The radio base station according to claim 16, wherein the control unit sets an unset reference signal transmission frequency band of the reference signal transmission frequency bands to the new serving radio terminal, when a new serving radio terminal is turned up where the reference signal transmission frequency band is not set.

21. The radio base station according to claim 16, wherein the control unit divides a single reference signal transmission frequency band and sets divided frequency bands to a plurality of serving radio terminals, when there is no unset reference signal transmission frequency band.

22. The radio base station according to claim 21, wherein the control unit sets the unset reference signal transmission frequency band to one of the plurality of serving radio terminals, when the unset reference signal transmission frequency band is turned up in a case where the single reference signal transmission frequency band is divided and set to the plurality of serving radio terminals.

23. A communication control method in a radio base station of an adaptive array scheme for applying an antenna weight to a plurality of antennas, comprising the steps of:
receiving a reference signal to be referred to in calculation of the antenna weight from a serving radio terminal;
setting a bandwidth of a reference signal transmission frequency band available for transmission of a reference signal by the serving radio terminal, according to priority determined on the basis of a communication state in the serving radio terminal; and
transmitting information on the set reference signal transmission frequency bands to the serving radio terminal.

* * * * *